US006965617B2

(12) United States Patent
Hasegawa et al.

(10) Patent No.: US 6,965,617 B2
(45) Date of Patent: Nov. 15, 2005

(54) RESYNCHRONOUS CONTROL APPARATUS OF SUBSCRIBER COMMUNICATION MACHINE, AND RESYNCHRONIZING METHOD

(75) Inventors: Kazutomo Hasegawa, Kawasaki (JP); Seiji Miyoshi, Kawasaki (JP); Nobukazu Koizumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 927 days.

(21) Appl. No.: 09/742,940

(22) Filed: Dec. 20, 2000

(65) Prior Publication Data

US 2001/0024454 A1 Sep. 27, 2001

(30) Foreign Application Priority Data

Mar. 16, 2000 (JP) ........................................ 2000-074620

(51) Int. Cl.[7] ................ H04J 3/06; H04L 7/00
(52) U.S. Cl. ................ 370/503; 370/509; 370/514; 375/354; 375/368
(58) Field of Search ................ 370/517, 503, 370/509, 514; 375/368, 367, 357, 354, 365, 370

(56) References Cited

U.S. PATENT DOCUMENTS 3,506,918 A * 4/1970 Perreault .................... 375/224
5,627,863 A * 5/1997 Aslanis et al. ............... 375/357
5,991,311 A * 11/1999 Long et al. .................. 370/524
2003/0190000 A1 * 10/2003 Matsumoto .................. 375/350
2004/0136405 A1 * 7/2004 Long et al. .................. 370/503

FOREIGN PATENT DOCUMENTS

| JP | 11-341153 | 12/1999 |
| JP | 11-355183 | 12/1999 |
| JP | 2000-32096 | 1/2000 |

* cited by examiner

Primary Examiner—Seema S. Rao
Assistant Examiner—Robert C. Scheibel, Jr.
(74) Attorney, Agent, or Firm—Katten Muchin Rosenman LLP

(57) ABSTRACT

A subscriber communication machine is provided with an off-synchronous detector detecting off-synchronization of communication with an office communication machine, a correlation processor, when the off-synchronization is detected, correlatively processing received data received over a communication line and held data having been transmitted from the office communication machine, and a resynchronization controller specifying a synchronous timing by the correlation process in the correlation processor to establish resynchronization in the communication with the office communication machine. When the subscriber communication machine cannot keep synchronization with a transmission cycle in a predetermined transmission system such as TCM in steady communication, it is possible to promptly resume the communication without the necessity for initializing all over again.

9 Claims, 15 Drawing Sheets

FIG. 3

*1130:* MAGNITUDE COMPARING MEMORY

| MEMORY NUMBER | DETERMINATION RESULT |
|---|---|
| J(0) | 1 |
| J(1) | 1 |
| J(2) | 1 |
| ⋮ | |
| J(N−2) | 1 |
| J(N−1) | 1 |

*1131:* DETERMINATION RESULT HOLDING MEMORY

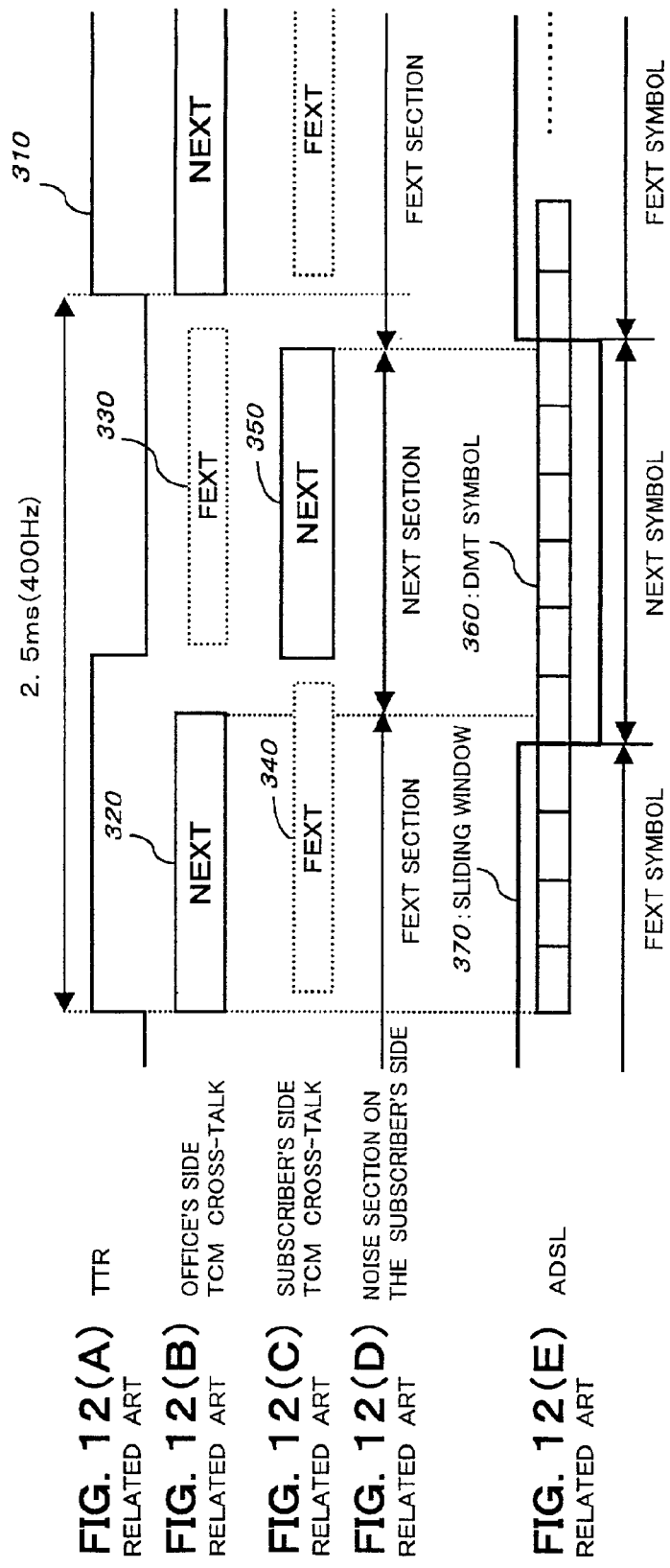

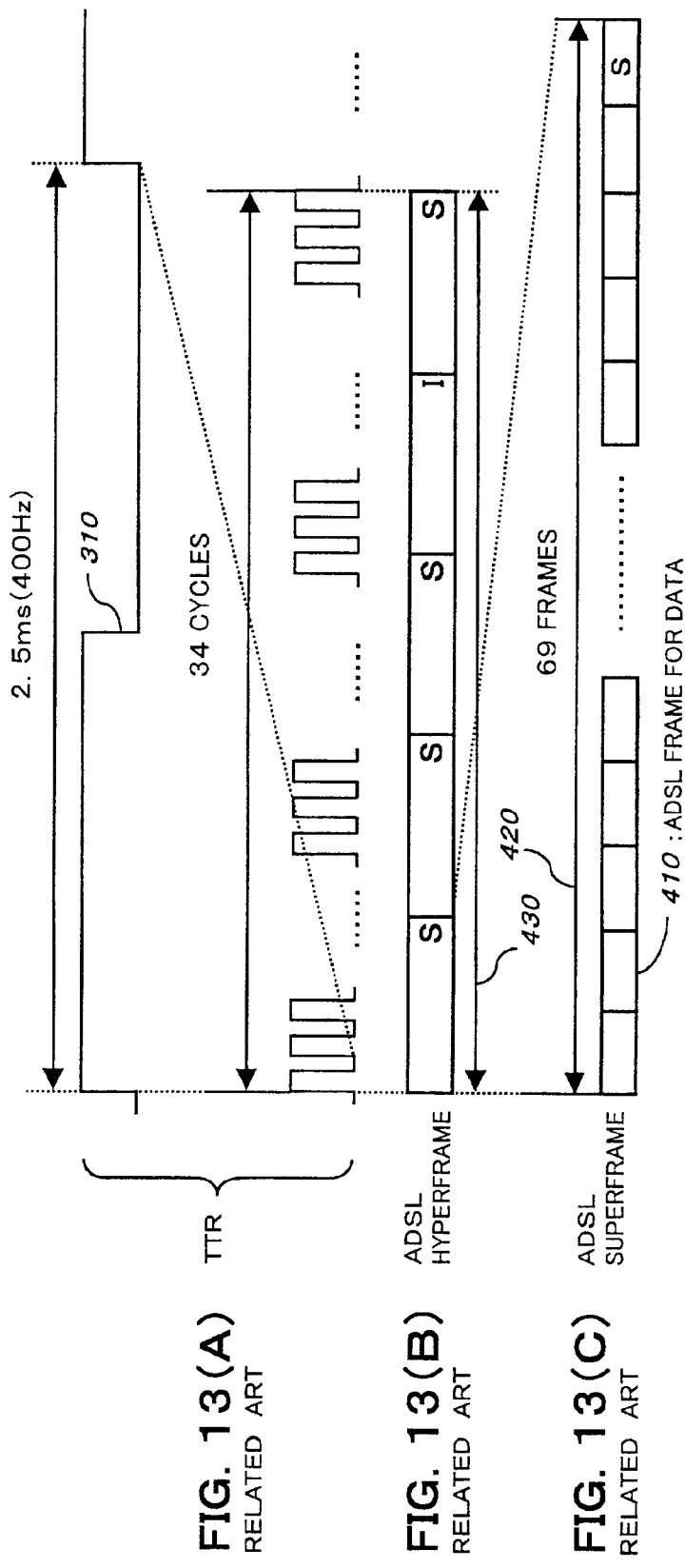

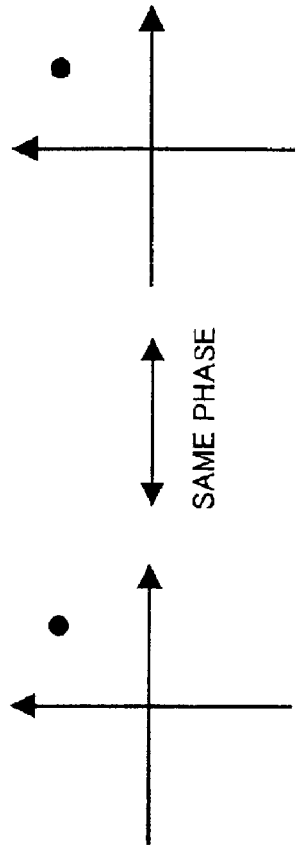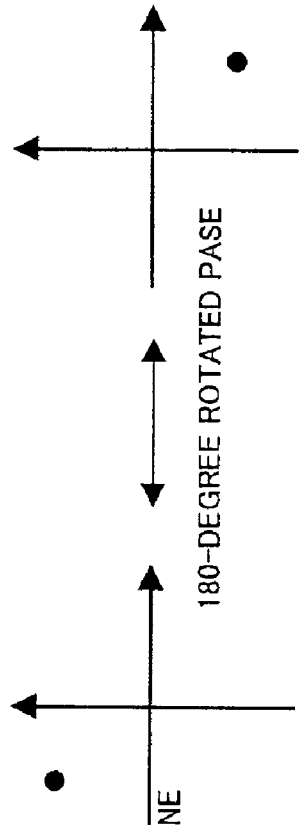
FIG. 14(A) RELATED ART
FIG. 14(B) RELATED ART

FEXT SYMBOL

NEXT SYMBOL

RESYNCHRONOUS CONTROL APPARATUS OF SUBSCRIBER COMMUNICATION MACHINE, AND RESYNCHRONIZING METHOD

BACKGROUND OF THE INVENTION (1) Field of the Invention

The present invention relates to a resynchronization control apparatus and a resynchronizing method suitable for use in a subscriber communication machine that can communicate in synchronization with a transmission cycle in, for example, ISDN (Integrated Services Digital Network) ping-pong transmission [TCM (Time Compression Multiplex) transmission] over a predetermined communication line such as a subscriber line.

(2) Description of Related Art

Recent widespread of multimedia-type services such as Internet and the like to the whole society including general home strongly demands early provision of an economical, highly reliable digital subscriber line transmission technique by which the user can enjoy such services. Enormous cost and time are required to newly lay communication lines, so that there have been proposed various methods for high-speed data communications using existing communication lines.

For instance, xDSL (Digital Subscriber line) attracts attention as a digital subscriber line transmission technique that uses existing telephone lines as high-speed data communication lines. The xDSL is a transmission system using existing subscriber lines, being also one of modulation-demodulation techniques. The xDSL is roughly classified into two according to whether the upstream transmission rate from the subscriber's premise (hereinafter referred to as subscriber's side) to the accommodating office (hereinafter referred to as office's side) and the downstream transmission rate from the office's side to the subscriber's side are symmetric or asymmetric.

As the symmetric type, there are HDSL (High-bit-rate DSL) whose upstream and downstream transmission rates are approximately 1.5 to 2.0 Mbps (megabit per second), SDSL (Single-line DSL) whose upstream and downstream transmission rates are approximately 160 k to 2.0 Mbps and the like, for example. As the asymmetric type, there is ADSL (Asymmetric DSL) that is tentatively operated in these years, extensively. The ADSL is further classified into "G.dmt" whose downstream transmission rate is approximately 6 Mbps, and "G.lite" (also called as light ADSL) whose downstream transmission rate is approximately 1.5 Mbps, both of which employ a distinctive modulation system called DMT (Discrete Multiple Tone) modulation.

In brief, the DMT modulation system divides the transmission frequency bandwidth into subcarriers each of about 4 kHz (in the case of "G.lite", approximately a maximum of 128 carriers in the downstream although it depends on conditions), and modulates each of the subcarriers. The DMT modulation system has a feature to be resistible to noise at a specific frequency since, even when a certain subcarrier is unusable due to an effect of the noise at the specific frequency, it allows the communication using another subcarriers.

Hereinafter, an ADSL transmission system employing such the DMT modulation system will be described in detail.

(1) Description of ADSL Transmission System

FIG. 6 is a block diagram showing an example of the ADSL transmission system. The ADSL transmission system shown in FIG. 6 is configured with an ADSL machine 650 installed on the office's side 610 and an ADSL machine 660 installed on the subscriber's side 620, which are connected to each other over a metallic line (telephone line) 70. Incidentally, the ADSL machine 650 on the office's side 610 will be occasionally referred to as an office ADSL machine 650, whereas the ADSL machine 660 on the subscriber's side 620 a subscriber ADSL machine 660, hereinafter. When not particularly discriminated between the office's side 610 and the subscriber's side 620, they will be referred to merely as ADSL machines 650 and 660.

As shown in FIG. 6, the office ADSL machine 650 comprises, as a transmitter (transmitting block) 910, a serial to parallel buffer 10, an encoder 20, an IFFT (Inverse Fast Fourier Transformer) 30, a parallel to serial buffer 40, a D/A (digital/analog) converter 50, and a transmit bit map memory 60.

On the other hand, the subscriber ADSL machine 660 comprises a receiver (receiving block) 960 including an A/D converter 80, a TEQ (Time-domain Equalizer) 90, a serial to parallel buffer 100, an FFT (Fast Fourier Transformer) 110, an FEQ (Frequency-domain Equalizer) 120, a decoder 130, a parallel to serial buffer 140, a receive bit map memory 150, an AGC (Automatic Gain Controller) 160, and multipliers 170 and 180.

FIG. 6 shows only a downstream structure from office's side to the subscriber's side. However, the office ADSL machine 650 is practically provided with a receiver having a function equivalent to that of the receiver 960 in the subscriber ADSL machine 660, whereas the subscriber ADSL machine 660 is provided with a transmitter having a function equivalent to that of the transmitter 910 in the office ADSL machine 650, whereby communication in the upstream is performed similarly to communication in the downstream, in principle. Here, the description will be made by way of the light ADSL (G.lite).

In the office ADSL machine 650, the transmit bit map memory 60 holds data (bit map) defining assignment of transmission bits to each (sub) carrier of a DMT signal to be generated. The serial to parallel buffer 10 stores transmit data that is serial data of one symbol duration (¼ kHz) converts the stored data into parallel data, and outputs the data. At this time, the assignment of a transmission bit number to each carrier (division of the frequency bandwidth) is performed according to the transmit bit map stored in the above transmit bit map memory 60. For example, when the number of subcarriers is i+1 where the subcarriers are C0 to Ci, a bit group bi of the above parallel data is assigned as a bit group to be transmitted on a subcarrier Ci in FIG. 6.

The above subcarriers sometimes include a carrier for synchronizing a timing called a pilot tone [a carrier positioning in the center of the 128 carriers is a pilot tone in the case of the downstream in the light ADSL], as shown in FIG. 7, for example. This pilot tone is used to transmit only a signal for synchronizing a timing; no data for the pilot tone exists in the transmit bit map memory 60.

The encoder 20 performs a predetermined modulation process such as quadrature amplitude modulation (QAM) on parallel data outputted from the serial to parallel buffer 10 for each of the above subcarriers according to the above transmit bit map. The IFFT 30 performs inverse fast Fourier transform on data (frequency-domain data) outputted from the encoder 20 to convert the data into time-domain data, thereby obtaining a DMT signal. Namely, the encoder 20 and the IFFT 30 function as a DMT modulating unit that DMT-modulates transmit data.

The parallel to serial buffer 40 converts the data (DMT signal) that has been subjected to the inverse fast Fourier transform in the above IFFT 30 into serial data, and adds a cyclic prefix to be described later thereto. The D/A converter 50 converts an output (serial data) of the parallel to serial buffer 40 to an analog signal using a predetermined sampling frequency (for example, 1.104 MHz). The obtained analog signal is outputted to the metallic line 70.

In the subscriber ADSL machine 660, the multiplier (for analog signal) 170 multiplies an analog signal received from the office ADSL machine 650 over the metallic line 70 by an arbitrary coefficient. The A/D converter 80 samples an output (analog signal) of the multiplier 170 at a predetermined sampling frequency (for example, 1.104 MHz) to convert the signal into a digital signal. The multiplier (for digital signal) 180 multiplies the digital signal from the A/D converter 80 by an arbitrary coefficient. The AGC 160 controls the coefficients to be multiplied in the above multipliers 170 and 180.

Multiplying a signal by an arbitrary coefficient is equivalent to amplifying the signal. Namely, the AGC 160 controls the coefficients to be multiplied in the multipliers 170 and 180, thereby controlling an amplification gain of a signal received over the metallic line 70. Incidentally, the amplification gain (coefficient) of an analog signal in the multiplier 170 will be called an analog AGC value, whereas the amplification gain (coefficient) of a digital signal in the multiplier 180 will be called a digital AGC value.

The TEQ 90 is an equalizer in time domain configured with, for example, an FIR (Finite Impulse Response) filter, which performs a predetermined process so that intersymbol interference (ISI) with an inputted signal is placed in the cyclic prefix added in the parallel to serial buffer 40 (detailed of which will be described later). The serial to parallel buffer 100 removes the cyclic prefix from data outputted from the TEQ 90, converts the data to parallel data, and outputs the same.

The FFT 110 converts output data from the above serial to parallel buffer 100 to data in frequency domain in the fast Fourier transform. The FEQ 120 is an equalizer in frequency domain, which equalizes data converted into the data in frequency domain by the FFT 110 as above according to transmission characteristics (frequency characteristics) of the metallic line 70, thereby compensating effects on the amplitude and phase exerted when the data passes through the metallic line 70 for each carrier at a different frequency.

The decoder 130 performs a predetermined demodulating process (QAM demodulation or the like) on output data of the above FEQ 120. The parallel to serial buffer 140 converts parallel data outputted from the decoder 130 into serial data, and outputs it. The receive bit map memory 150 holds information (receive bit map) on the transmission bit number of each carrier assigned to each carrier on the transmitting side according to the transmit bit map in the transmit bit map memory 60. On the basis of this information, the demodulation process by the decoder 130 and the parallel to serial buffer 140 mentioned above is carried out.

Next, description will be made of an operation of the above-structured ADSL transmission system.

When transmit data is inputted to the office transmitter 910, the transmit data of one symbol duration (¼ kHz) is held in the serial to parallel buffer 10. The held data is divided into groups each of the transmit bit number per carrier determined beforehand according to the transmit bit map 60, and outputted to the encoder 20.

The encoder 20 converts the inputted bit sequences into signal points to be quadrature-amplitude-modulated, and output them to IFFT 30. The IFFT 30 performs the inverse fast Fourier transform on outputs of the encoder 20 to quadrature-amplitude-modulate each of the signal points, and outputs them to the parallel to serial buffer 40. Meanwhile, the encoder 20 and the IFFT 30 performs the DMT modulation.

The parallel to serial buffer 40 adds 16 samples (240 to 255 samples) out of outputs of the above IFFT 30 as the cyclic prefix to the head of the DMT symbol (details of which will be described later). The data to which the cyclic prefix has been added is sent from the parallel to serial buffer 40 to the D/A converter 50, converted to an analog signal at a sampling frequency of 1.104 MHz therein, and transmitted to the subscriber receiver 960 over the metallic line 70.

In the subscriber receiver 960, the analog signal received over the metallic line 70 is amplified by the multiplier 170, converted into a digital signal at 1.104 MHz by the A/D converter 80, and inputted to the multiplier 180. The multiplier 180 again amplifies the inputted digital signal, and outputs it to the TEQ 90. At this time, the AGC 160 measures a magnitude of each signal at the multipliers 170 and 180, and sets the AGC values to each signal and changes the same as needed.

The TEQ 90 equalizes an output of the multiplier 180 in time domain such that ISI is placed within the cyclic prefix of 16 samples, and makes the serial to parallel buffer 100 hold data of one DMT symbol. The serial to parallel buffer 100 removes the above cyclic prefix from the data of one DMT symbol inputted from the TEQ 90, then converts the remaining data into parallel signals, and outputs them to the FFT 110.

The FFT 110 performs fast Fourier transform on outputs of the above serial to parallel buffer 100 to convert signals in time domain into signal point data in frequency domain. The FEQ 120 compensates effects on the amplitude and phase of the converted signal point data on each carrier having a different frequency exerted when the signal passes through the metallic line 70. The decoder 130 then demodulates the data according to the receive bit map in the receive bit map memory 150 holding the same values as the transmit bit map 60. The data demodulated by the decoder 130 is held for awhile in the parallel to serial buffer 140, converted into a serial bit string, and outputted as receive data.

(2) Description of Equalizer (2-1) Detailed Description of TEQ 90

Next, description will be made of a role of the above TEQ 90.

When the DMT symbol inputted to the above parallel to serial buffer 40 in FIG. 6 is in a state shown in FIG. 8(A), the parallel to serial buffer 40 copies 16 samples in the tail of the DMT symbol, and attaches them to the head of the DMT symbol, as shown in FIG. 8(B). The copied portion is the above cyclic prefix.

The DMT symbol added thereto the cyclic prefix as shown in FIG. 8(C) is sent to the D/A converter 50, converted to an analog signal at the sampling frequency of 1.104 MHz in the D/A converter 50, and transmitted to the subscriber ADSL machine 660 over the metallic line 70. The receive signal received over the metallic line 70 whose amplitude characteristics and phase characteristics to the frequency are not constant is distorted due to an effect of ISI, as shown in FIG. 8(D), for example.

The TEQ 90 described with reference to FIG. 6 performs such a process (ISI compressing process) as to place the ISI within only the cyclic prefix of 16 samples, and the serial to parallel buffer 100 removes the cyclic prefix, whereby a DMT symbol in which the effect of the ISI has been eliminated is obtained as shown in FIG. 8(F).

The TEQ 90 functions to eliminate the effect of ISI from the received signal using the cyclic prefix. In more detail, since the metallic line 70 has non-linear low pass filter (LPF) characteristics that deteriorate the transmission characteristics in the high frequency bandwidth, an impulse response having a constant length is generated at a discontinuous portion existing between symbols. This impulse response is overlaid on the data signal to cause deterioration of the signal.

Accordingly, 16 bits in the tail are added to the head of the symbol to form the cyclic prefix. A portion at which the cyclic prefix is combined with the symbol becomes continuous, so that no impulse response is generated at this portion. On the other hand, a portion at which the head of the cyclic prefix is combined with the preceding symbol becomes discontinuous, so that the impulse response is generated at this portion.

By inputting the received data to the TEQ 90 having characteristics of a high pass filter (HPF) reverse to those of the metallic line 70, the impulse response can be placed within the cyclic prefix. The cyclic prefix so processed is removed, whereby data not affected by the impulse response can be obtained.

(2-2) Adaptive Operation Algorithm of TEQ 90

In order that the TEQ 90 performs the above-mentioned process to place ISI within only the cyclic prefix of 16 samples as shown in FIG. 8O(E), an adaptive operation to make the TEQ 90 have such the characteristics is required. For this purpose, the TEQ 90 comprises, as a block for the adaptive operation only, a reference signal generation block 920, a delay unit 930, a target channel block 940, and an adder 950, as shown in FIG. 9, for example. Incidentally, identical numerals in FIG. 9 identify identical or like parts in FIG. 6 described above. The structural elements of the receiving side block 960 shown in FIG. 6 other than the TEQ 90 are not shown in FIG. 9 in order to simplify the description.

The reference signal generation block 920 generates the same signal x(t) as a transmit signal (known received signal in the receiving side block 960) transmitted in the past from the transmitting side block 910, and outputs it. The delay unit 930 delays the reference signal x(t) generated by the reference signal generating block 920 by a predetermined time, and outputs it.

The target channel block 940 outputs a result b(t)*x(t), which is to be a target when the characteristics of the TEQ 90 are adjusted, obtained by convolution-integrating a characteristic b(t) (provided a delay quantity caused by the metallic line 70 is excluded) synthesized from the characteristics of the metallic line 70 and the characteristics of the TEQ 90 for the reference signal x(t) delay by the delay unit 930. The adder 950 computes a difference between an output z(t) of the TEQ 90 and an output b(t)*x(t) of the target channel block 940, and supplies the obtained result e(t) to the TEQ 90 and the target channel block 940. The TEQ 90 and the target channel block 940 thereby perform the adaptive operation such that the output e(t) of the adder 950 becomes "0."

Next, description will be made of the adaptive operation of the above TEQ 90.

When a transmit signal x(t) is transmitted from the transmitting side block 910, the transmit signal x(t) is received by the receiving side block 960 over the metallic line 70. In the receiving side block 960, a result z(t) obtained by adding the characteristics of the TEQ 90 to the received signal by the TEQ 90 is supplied to the adder 950.

At this time, the reference signal generation block 920 generates a reference signal x(t) that is assumed to be the same as the transmit signal, and outputs it. The delay unit 930 delays the reference signal x(t) by a predetermined quantity such that the phase of an output z(t) of the TEQ 90 coincides with the phase of an output b(t)*x(t) of the target channel block 940. The target channel block 940 convolution-integrates the characteristic b(t) for the reference signal x(t), and supplies the obtained result b(t)*x(t) to the adder 950.

The adder 950 computes a difference e(t) between the output z(t) of the TEQ 90 and the output b(t)*x(t) of the target channel block 940, and supplies the obtained result to the TEQ 90 and the target channel block 940. The TEQ 90 and the target channel block 940 perform the adaptive operation on the basis of the difference e(t) supplied from the adder 950. Namely, the TEQ 90 and the target channel block 940 carry out the adaptive operation such that the output e(t) from the adder 950 becomes "0."

As a result, the TEQ 90 has such a processing characteristic as to place ISI within only the cyclic prefix of 16 samples, as shown in FIG. 8(E).

(2-3) Adaptive Operation Algorithm of FEQ

Next, description will be made of an example of an adaptive operation algorithm of the above FEQ 120.

As described above, the FEQ 120 is an equalizer in frequency domain, which equalizes effects (changes in amplitude characteristics and phase characteristics) on a plurality of carriers having different frequencies exerted when the carriers pass through the metallic line 70 such as to equalize the characteristics of all the carriers. For this purpose, the FEQ 120 is provided with circuits shown in FIG. 10 in number corresponding to the number of the above carriers. Incidentally, identical numerals in FIG. 10 designate corresponding parts in FIG. 6.

In FIG. 10, a coefficient unit 1010 multiplies an input signal (received signal) Yi by a coefficient Wi. A value of the above coefficient Wi can be changed according to an output of adder 1020. In FIG. 10, a decision unit (Decision) 1030 detects a decision value Xi that is assumed to correspond to the input signal Yi, and outputs it. The adder 1020 computes a difference Ei between an output Xi of the decision unit 1030 and an output Zi of the coefficient unit 1020, and sets a coefficient Wi of the coefficient unit 1010 according to a result of the computation.

In the circuit structured as above, a decision value Xi is determined by inputting an output Zi of the FEQ 120 to the decoder 130, a difference Ei between the decision value Xi and an output Zi of the FEQ 120 is determined by the adder 1020, and a coefficient Wi of the coefficient unit 1010 is such adjusted that the difference Ei becomes "0." As a result, the above equalizing process in frequency domain is adaptively performed. Incidentally, the above decoder 130 converts a decision value Xi into a bit sequence bi, and supplies the bit sequence bi to the parallel to serial buffer 140 shown in FIG. 6.

(3) Crosstalk from ISDN Ping-Pong Transmission Line

Since ADSL is a technique using communication lines, there are some instances where an ISDN ping-pong transmission line [TMC (Time Compression Multiplex) line] 70' exists in the vicinity of the metallic line 70 (hereinafter referred to as an ADSL line 70) (in concrete, the ADSL line 70 and the TCM line are laid in parallel in the same cable). In such case, the ADSL line 70 is affected by crosstalk (TCM crosstalk) from the TCM line 70'.

In TCM transmission, in synchronization with a signal [TTR (TCM-ISDN Timing Reference)] 310 at 400 Hz as shown in, for example, FIG. 12(A), an office ISDN machine 630 shown FIG. 11 transmits downstream data in the first half cycle of the TTR 310, and a subscriber ISDN machine 640 transmits upstream data in the latter half cycle. For this, the office ADSL machine 605 is affected by near-end crosstalk (NEXT) 320 from the downstream data of the office ISDN machine in the first half cycle of the TTR 310, and affected by far-end crosstalk (FEXT) 330 from the upstream data of the subscriber ISDN machine 640 in the latter half cycle, as shown in FIG. 12(B).

In contrast to the office ADSL apparatus 650, the subscriber ADSL machine 660 is affected by FEXT 340 from downstream data of the office ISDN machine 603 in the first half cycle of the TTR 310, and affected by NEXT 350 from upstream data of the subscriber ISDN machine 640 in the latter half cycle, as shown in FIG. 12(C) Hereinafter, a noise section affected by NEXT will be referred to as an NEXT section, and a noise section affected by FEXT will be referred to as an FEXT section. Incidentally, FIG. 12(D) shows the NEXT section and the FEXT section in the subscriber ADSL machine 660. The effect in the NEXT section is generally larger than the effect in the FEXT section.

(4) Description of Sliding Window

In order to transmit well ADSL signals in the environment where TCM crosstalk (NEXT section, FEXT section) mentioned above exists, "sliding window" is introduced. The "sliding window" is used to specify the FEXT section in which the effect of TCM crosstalk is smaller than that in the NEXT section. Effective use of the specified FEXT section can minimize the effect of TCM crosstalk, thereby certainly transmitting data.

In the downstream direction where an ADSL signal is transmitted from the office ADSL machine 650 to the subscriber ADSL machine 660, states of the ADSL signal are defined as follows using the "sliding window":

As shown in FIG. 12(E), when a transmit DMT symbol 360 is completely involved in the FEXT section in the subscriber ADSL machine 660, the office ADSL machine 650 transmits the symbol as an FEXT symbol using a sliding window 370. When the transmit symbol is at least partly involved in the NEXT section of the subscriber ADSL machine 660, the office ADSL machine 650 transmits the symbol as an NEXT symbol. Such transmitting method is called a dual bit map method.

In the upstream, the subscriber ADSL machine 660 transmits the DMT symbol in the similar manner. In the downstream, the office ADSL machine 650 may transmit a pilot tone instead of the NEXT symbol in the NEXT symbol section. Such transmitting system is called an FEXT bit map system. In the FEXT bit map system, the subscriber ADSL machine 660 transmits nothing in the downstream in a section of the NEXT symbol.

(5) Description of Frame Structure in ADSL Communication

The above "sliding window" is asynchronous with the TTR in TCM transmission. Here, a hyperframe used in ADSL communication in synchronization with the TTR will be explained.

In ADSL communication, one frame corresponds to one symbol. In steady communication, 69 frames, which are 68 ADSL frames 410 for user data and one frame for a synchronization symbol S, form one superframe 420, as shown in FIG. 13(C), for example. Further, as shown in FIG. 13(B), five superframes 420 form one hyperframe 430.

Into the hyperframe 430, an inverse synchronization symbol I may be inserted instead of the synchronization symbol S. The inverse synchronization symbol I corresponds to a signal whose phase is rotated 180 degrees from a phase of the synchronization symbol S in the case of carriers other than the pilot tone, as shown in FIG. 14(B). In the case of the pilot tone, the inverse synchronization symbol I corresponds to a signal having the same phase as the synchronization symbol S, as shown in FIG. 14(A).

In the case of a hyperframe in the downstream from the office ADSL machine 650 to the subscriber ADSL machine 660, the inverse synchronization symbol I is decided to be placed (inserted) in the fourth superframe 420 in one hyperframe 430, as shown in FIG. 13(B). In the upstream, the inverse synchronization symbol I is involved in the first superframe 420 in one hyperframe 430. As shown in FIG. 13(A), one hyper frame 430 synchronizes with 34 cycles of the TTR 310 in the above-mentioned TCM transmission.

(6) Report on TTR 310 Phase Information to the Subscriber ADSL Machine 660.

In order that the above mentioned ADSL machine 650 or 660 transmits and receives data using the sliding window 370 and the hyperframe 430, it is necessary for the ADSL machine 650 or 660 to recognize in which frame in the hyperframe 430 data now being transmitted/received in synchronization with the TTR 310 is, or whether the data is transmitted/received as an FEXT symbol or an NEXT symbol.

As shown in FIG. 11, the ADSL machine 650 on the office's side 610 can easily obtain phase information 670 on the TTR 310 from the ISDN machine 630 when installed on the same office's side 610 as the office ISDN machine 630. However, the subscriber ADSL machine 660 is separately installed in the subscriber's premise (on the subscriber's side 620), in general, so that the subscriber ADSL machine 660 cannot obtain the phase information 670 on the TTR 310 from the ISDN machine 640 installed in other subscriber's premise. For this, the subscriber ADSL machine 660 is required to receive the phase information 670 on the TTR from the office ADSL machine 650.

The office ADSL machine 650 therefore transmits the phase information 670 on the TTR 310 received from the office ISDN machine 630 using a carrier for reporting to the subscriber ADSL machine 660, at the time of initialization before the ADSL communication starts. Namely, the office ADSL machine 650 transmits the phase information 670 on the TTR 310 as the FEXT symbol [refer to FIG. 15(A)] or the NEXT symbol [refer to FIG. 15(B)] as decided by the sliding window 370 described above with reference to FIG. 12(E). At this time, the FEXT symbol and the NEXT symbol differ from each other in only phase.

Which frame in the hyper frame 430 should be transmitted as the FEXT symbol, or whether the frame should be transmitted as the NEXT symbol is decided in relation to the sliding window 370. Accordingly, the subscriber ADSL machine 660 can recognize which frame in the hyperframe is now received by receiving the above signal (FEXT symbol or NEXT symbol) transmitted from the office ADSL machine 650.

Since one hyperframe 430 synchronizes with 34 cycles of the TTR 310, as stated above, the subscriber ADSL machine 660 can obtain the phase information 670 on the TTR 310 from the above frame position information in the received hyperframe 430, thereby synchronizing with the TTR 310. After synchronization with the TTR 310 is established, the synchronization is kept using the above pilot tone.

As above, when the TCM line 70' exists in the vicinity of the ADSL line 70, the ADSL machines 650 and 660 transmit/receive data using the sliding window 370 and the hyper frame 430 to minimize the effect of TCM crosstalk, thereby realizing reliable data transmission.

However, the above ADSL machine of "G.lite", for example, is not provided with a splitter, that is, a low-pass filter (LPF). Accordingly, when the subscriber ADSL machine 660 cannot accurately receive a pilot tone for maintaining synchronization transmitted from the office ADSL machine 650 for a long time (1.8 ms or longer, for example) in steady communication due to effects of impulse noise caused by off-hook or higher harmonic noise caused by ringer generated in a telephone connected to the same line as the subscriber ADSL machine 660, or crosstalk noise caused by off-hook or ringer generated in a telephone on the adjacent line, the subscriber ADSL machine 660 cannot synchronize with the TTR 310. In such case, the ADSL communication thereafter cannot be continued. In order to re-communicate, it is necessary to initialize once more in the present condition. As this, the ADSL communication is interrupted for a long time once the synchronization with the TTR 310 becomes off.

SUMMARY OF THE INVENTION

In consideration of the above problem, an object of the present invention is to be able to promptly resume communication without initializing once more when a subscriber communication machine cannot keep synchronization with a transmission cycle in TCM in steady communication.

To achieve the above problem, the present invention provides a resynchronization control apparatus for a subscriber communication machine which communicates with an office communication machine over an existing communication line comprising an off-synchronous detector for detecting off-synchronization of communication with the office communication machine, a correlation processor for correlatively processing received data received over the communication line and held data having been transmitted from the office communication machine when the off-synchronous detector detects the off-synchronization, and a resynchronization controller for specifying a synchronous timing by the correlation process of the correlation processor to establish resynchronization in communication with the office communication machine.

In the resynchronization control apparatus having the above structure, when off-synchronization with the office communication machine is detected (off-synchronization detecting step), received data received thereafter and held data having been transmitted from the office communication machine are correlatively processed (correlation processing step). At this time, the held data is exerted an effect (transmission loss) according to transmission characteristics of the communication line, so that the correlation process is performed in consideration of the transmission characteristics of the communication line. The resynchronization controller specifies a synchronous timing by the above correlation process to establish resynchronization with the office communication machine (resynchronization controlling step).

When off-synchronization occurs, it is unnecessary to re-do the process (initialization) required when the communication is started in order to establish resynchronization. It is possible to certainly establish resynchronization in consideration of the transmission characteristics of the communication line, which allows the communication to be resumed promptly and certainly.

The above correlation processor may comprise a signal holder for holding signal data received from the office communication machine in steady communication, and a correlation operator for operating correlation between held data held in the signal holder and received data received after detection of the off-synchronization to detect received data having high correlation with the held data. When off-synchronization occurs, it is possible to detect a signal having high correlation with a signal received and held in the steady communication before the off-synchronization occurs in consideration of the transmission loss caused by the communication line.

It is therefore possible to certainly detect a transmission cycle, and accomplish resynchronization control.

The signal holder may hold an average value of received data in a certain section in the steady communication as the held data. In which case, an effect of the communication line on the received signal (held signal data) can be averaged with respect to time, which leads to more stable signal detecting process, further to more stable resynchronization control. This contributes to improvement of reliability of the resynchronization control.

The signal detection processor may comprise a maximum value holder for holding a maximum value of absolute values of the held data or a value obtained by adding an arbitrary margin value to that maximum value, and a maximum value determination type correlation operation controller for making the correlation operator carry out the correlation operation on only a section in which absolute values of received data received after the off-synchronization is detected are not larger than a value held in the signal data maximum value holder.

Namely, a received signal whose absolute value is larger than a maximum value of absolute values of the held data or a value obtained by adding an arbitrary margin value to that maximum value is assumed to have lower correlation with the held data, so that such data is eliminated from objects of the correlation operation. This decreases a quantity of the operation by the correlation operator.

Accordingly, a quantity of the process required until resynchronization is established, that is, a delay time, can be largely decreased.

As another mode, the signal detection processor may comprise a signal data minimum value holder for holding a minimum value, as a first value, of absolute values of the held data or a second value obtained by multiplying a value, which is obtained by adding an arbitrary margin value to the minimum value, by an arbitrary coefficient, and a result of comparison between the first or second value and an absolute value of the held data, and a minimum value determination type correlation operation controller for making the correlation operator carry out the correlation operation in only a time section in which absolute values of received data of whole one symbol received after the off-synchronization is detected are larger than the minimum value or a value obtained by multiplying a value, which is obtained by adding an arbitrary margin value to that minimum value, by an arbitrary coefficient not larger than the coefficient at samples in which the absolute values of the held data are determined to be larger as results of the comparison.

If the received signal (data) satisfies the above-described value condition, the signal data is assumed to have low correlation with the held signal, so that the signal data is eliminated from objects of the correlation operation, which in turn decreases a quantity of the correlation operation in the correlation operator.

In this case, it is possible to decrease a quantity of the correlation operation as well, leading to a large decrease of a quantity of the process required until resynchronization is established, that is, a delay time.

The signal detection processor may comprise a frame boundary detector for detecting a frame boundary of the signal data on the basis of correlation between signal data of a length of a cyclic prefix attached to the head of received data received after off-synchronization is detected and signal data of a length of the cyclic prefix attached to the tail of the same, and a frame boundary detection type correlation operation controller for making the correlation operator carry out the correlation operation on a frame specified by a frame boundary detected by the frame boundary detector.

Accordingly, a frame of a received signal can be specified from signal data received after off-synchronization is detected, and the correlation operation can be carried out for each frame. It is therefore unnecessary to carry out the correlation operation on a range (unit) that likely has lower correlation, which eliminate wasteful correlation operating process.

In this case, it is possible to largely decrease a time required until resynchronization is established, as well.

When the subscriber communication machine includes an equalizer for adaptively equalizing received data from the office communication machine while updating a predetermined equalization coefficient, the resynchronization controller may make the equalizer not update the equalization coefficient until the resynchronization is established after the off-synchronization is detected. In which case, it is possible to avoid the equalization coefficient from being updated on the basis of a received signal without reliability obtained while off-synchronization occurs.

The communication after resynchronization is established can thereby be stabilized as same as before occurrence of the off-synchronization.

When the subscriber communication machine includes a gain amplifier for adaptively amplifying a gain of received data from the office communication machine while updating a predetermined gain coefficient, the resynchronization controller may make the gain amplifier not update the gain coefficient until the resynchronization is established after the off-synchronization is detected. In which case, it is possible to avoid the gain coefficient from being updated on the basis of a received signal without reliability obtained while off-synchronization occurs.

The communication after resynchronization is established can thereby be stabilized as same as before occurrence of the off-synchronization, as well.

The resynchronization controller may stop transmission to the office communication machine until the resynchronization is established when the off-synchronization is detected by the off-synchronous detector. In which case, it is possible to eliminate an effect of crosstalk or the like on the received signal caused by a transmit signal to the office communication machine, which leads to more stable resynchronization control.

BRIEF DESCRIPTION OF THE DRAWINGS

FIG. 3 is a block diagram showing an example of a structure of a magnitude comparing memory shown in FIG. 1;

FIGS. 12(A) through 12(E) are timing charts for illustrating a relation between a signal transmitting/receiving timing on the TCM line and a signal transmitting/receiving timing on the ADSL line;

FIGS. 13(A) through 13(C) are diagrams for illustrating a frame structure of a signal in the ADSL communication;

FIGS. 14(A) and 14(B) are diagrams for illustrating a relation between phases of a synchronization symbol and an inverse synchronization symbol.

DESCRIPTION OF THE PREFERRED EMBODIMENTS

Hereinafter, description will be made of an embodiment of this invention with reference to the drawings.

(A) Description of an Embodiment

Figure 1:
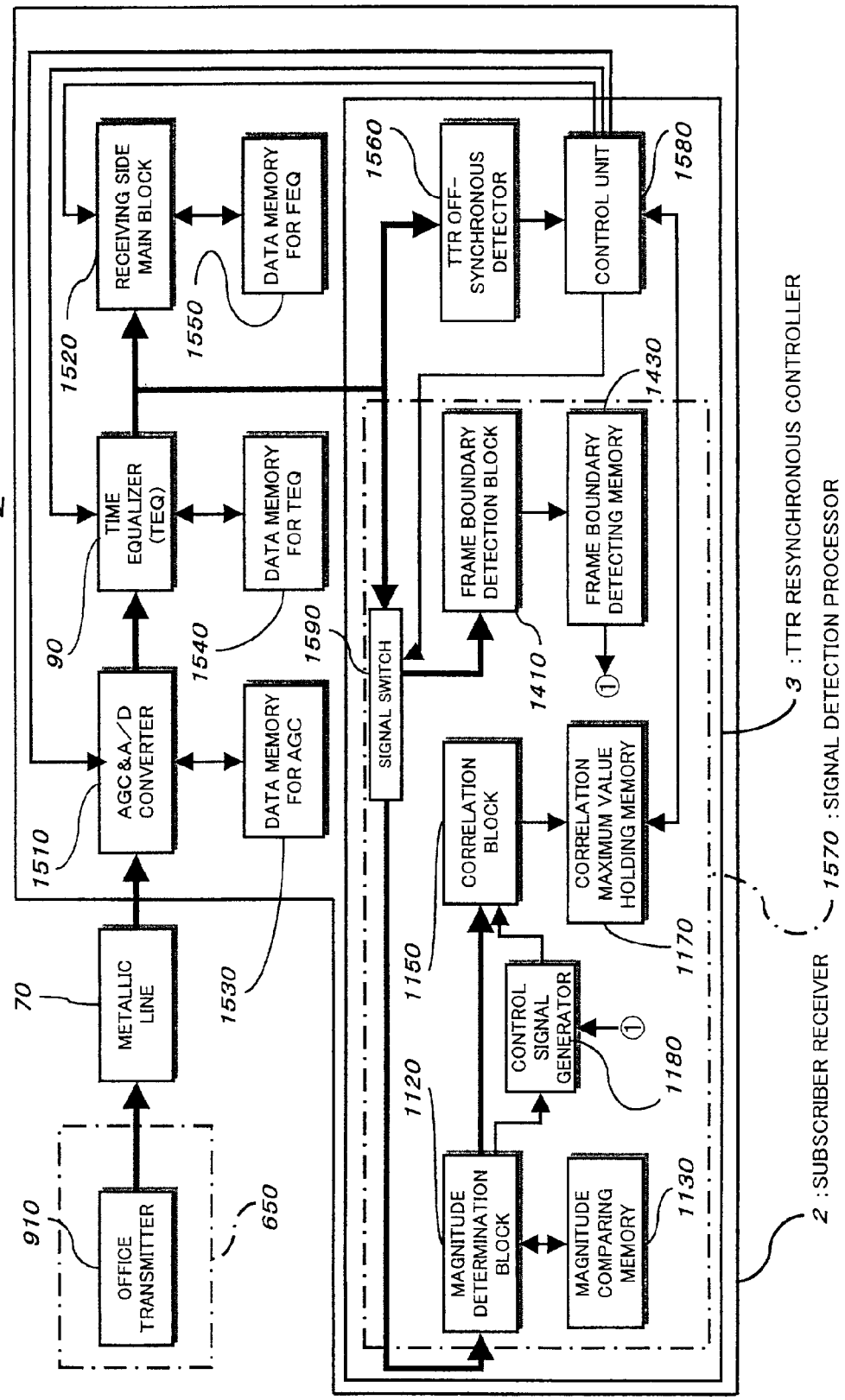
FIG. 1 is a block diagram showing a structure of a subscriber ADSL machine (subscriber communication machine) when attention is paid to a receiving side block (receiver) according to an embodiment of this invention.

FIG. 1 is a block diagram showing a structure of a subscriber ADSL machine (subscriber communication machine) when attention is paid to a receiving side block (receiver) thereof, according to an embodiment of this invention. As shown in FIG. 1, the subscriber ADSL machine 1 includes as a receiver 2 (hereinafter referred to as a subscriber receiver 2), an AGC & A/D converter 1510, a time equalizer (TEQ) 90, a receiving side main block 1520, a data memory for AGC 1530, a data memory for TEQ 1540, and a data memory for FEQ 1550, and further includes as a TTR resynchronization controller 3, a TTR off-synchronous detector 1560, a signal detection processor 1570, a control unit 1580, and a signal switch 1590.

This subscriber receiver 2 is applied at the same position as the subscriber ADSL machine 660 described above with reference to FIG. 6. In this case, the subscriber receiver 2 is connected to the transmitter (office transmitter) 910 of the office ADSL machine 650 over the metallic line (ADSL line) 70, whereby communication (downstream communication) in synchronization with the above-mentioned TTR 310 is carried out. Although FIG. 1 shows only the structure in the downstream (from the office transmitter 910 to the subscriber receiver 2), an office receiver having a function equivalent to the receiver 960 in the known subscriber ADSL machine 660 is provided in the office ADSL machine 650, and a subscriber transmitter having a function equivalent to that of the office transmitter 910 is provided in the subscriber ADSL machine 1, in practice, so that two-way communication is possible.

Hereinafter, each of the above structural elements in the subscriber receiver 2 will be described.

The above AGC & A/D converter 1510 is a collective expression of a portion comprising the AGC 160, the multipliers 170 and 180, and the A/D converter 80, whose functions are similar to those described above with reference to FIG. 6. Note that the data memory for AGC 1530 is connected to the AGC & A/D converter 1510 to hold data for updating AGC (AGC value) to be described later therein.

The TEQ 90 is basically similar to that described above with reference to FIG. 6, configured with an FIR (Finite Impulse Response) filter, for example, to perform a process to place the inter symbol interference (ISI) with an input signal within the cyclic prefix added by the parallel to serial buffer 40 (refer to FIG. 6) in the office transmitter 910.

Figure 6:
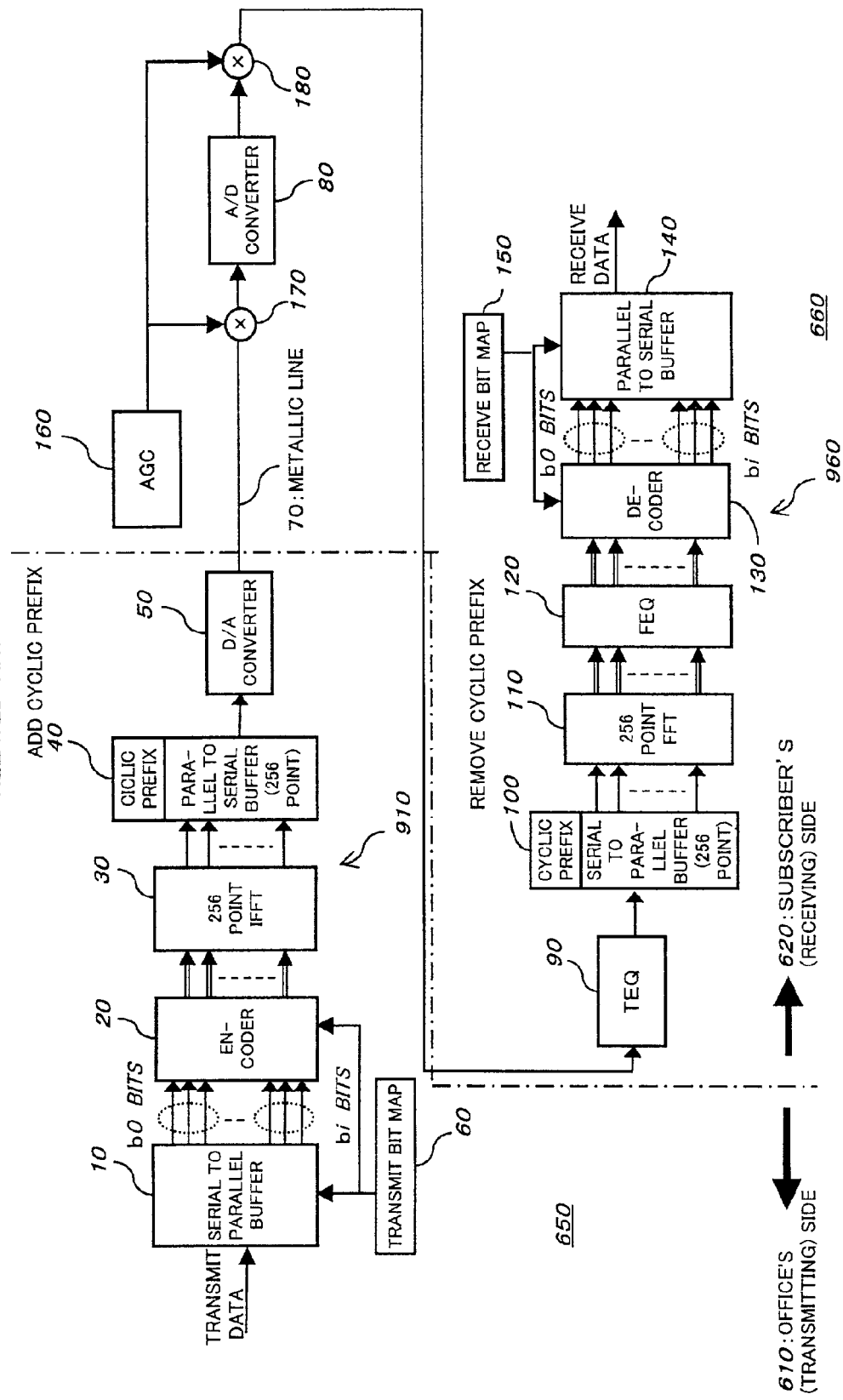
FIG. 6 is a block diagram showing an example of ADSL transmission systems.
Figure 7:
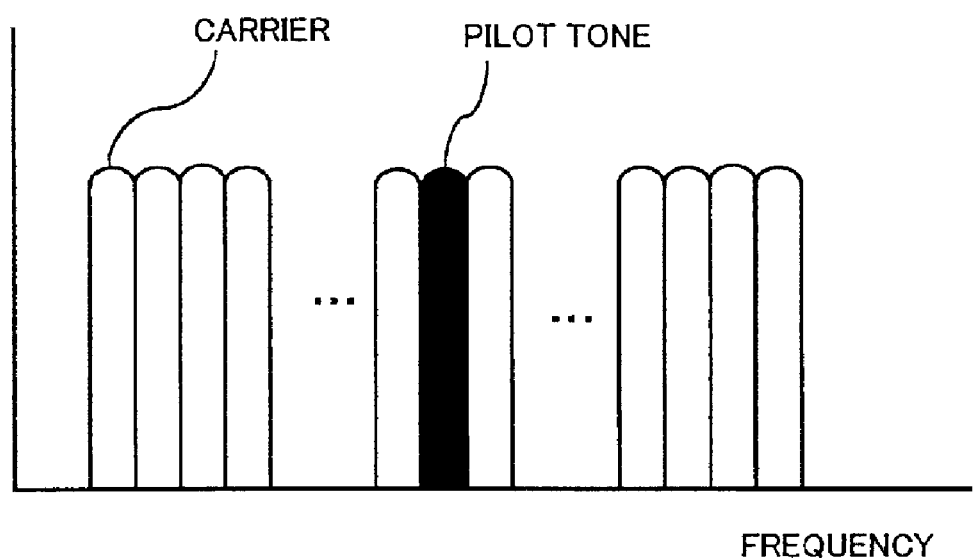
FIG. 7 is a diagram for illustrating carriers used in the ADSL communication (DMT modulation system)
Figure 8A:
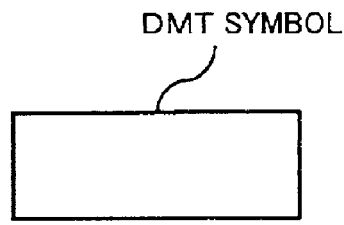
FIGS. 8(A) through 8(F) are schematic diagrams for illustrating a method for removing ISI in a DMT signal using cyclic prefix.
Figure 8B:
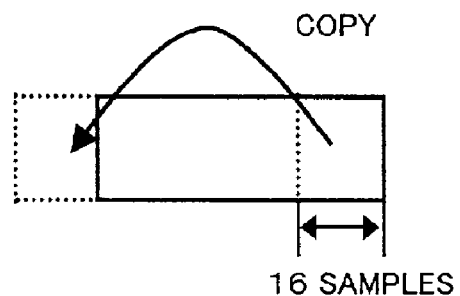
Figure 8C:
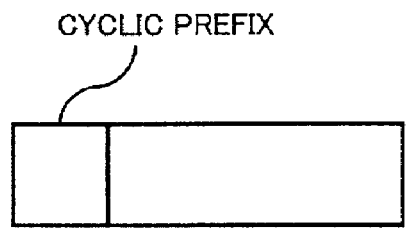
Figure 8D:
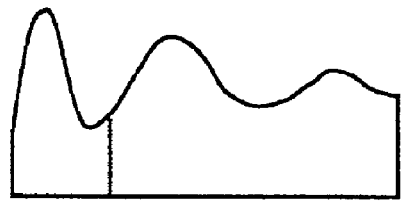
Figure 8E:
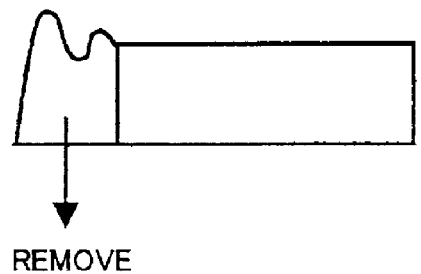
Figure 8F:
Figure 9:
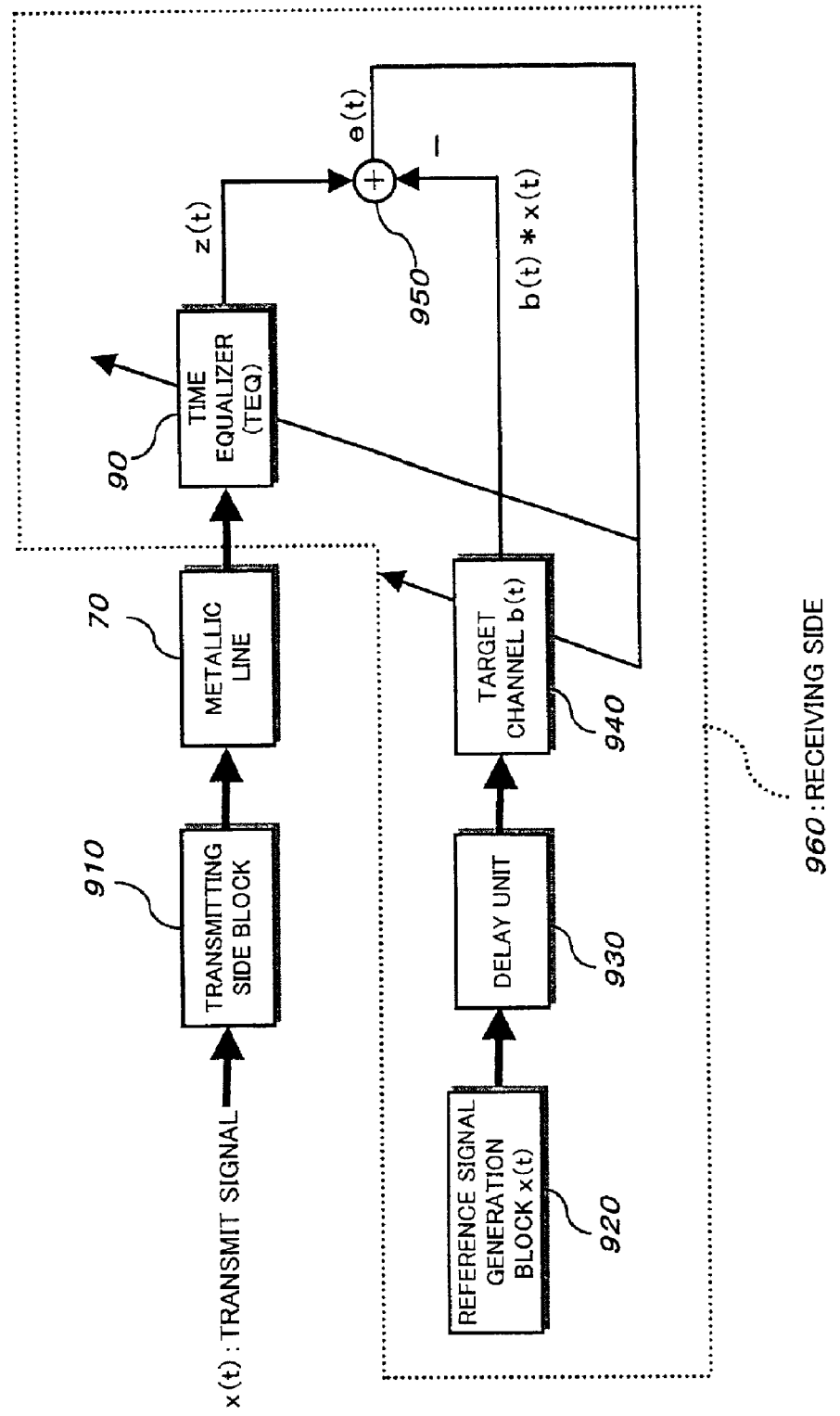
FIG. 9 is a block diagram showing an example of a structure of the subscriber receiver when attention is paid to a TEQ.

The receiving side main block 1520 is a collective expression of a portion comprising the serial to parallel buffer 100, the FFT 110, the FEQ 120, the decoder 130, and the parallel to serial buffer 140 shown in FIG. 6. The units 100 to 140 allow to perform a similar receiving process to that described above with reference to FIG. 6.

Figure 10:
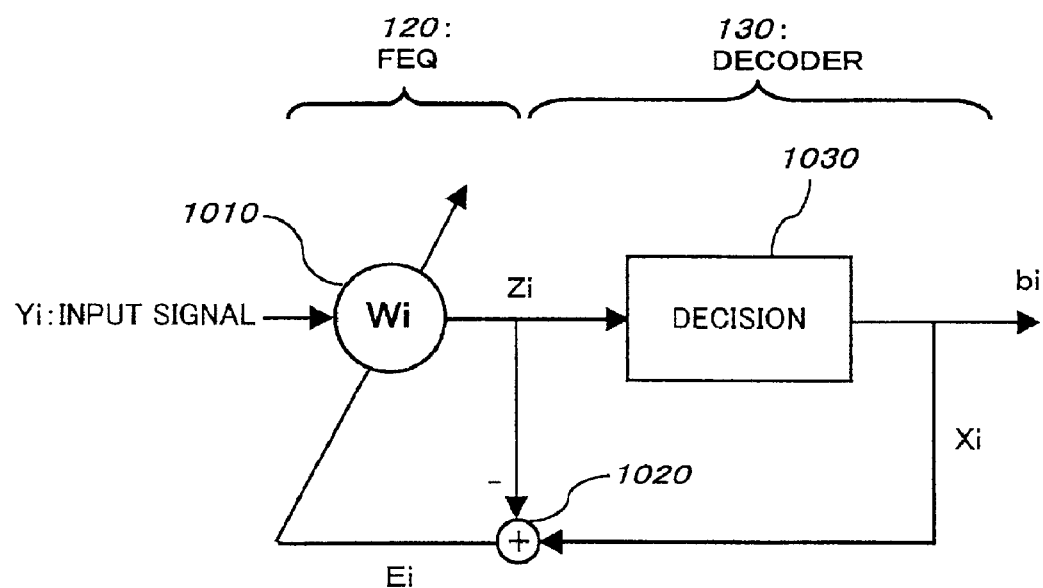
FIG. 10 is a block diagram showing an example of the structure of the subscriber receiver when attention is paid to an FEQ.
Figure 11:
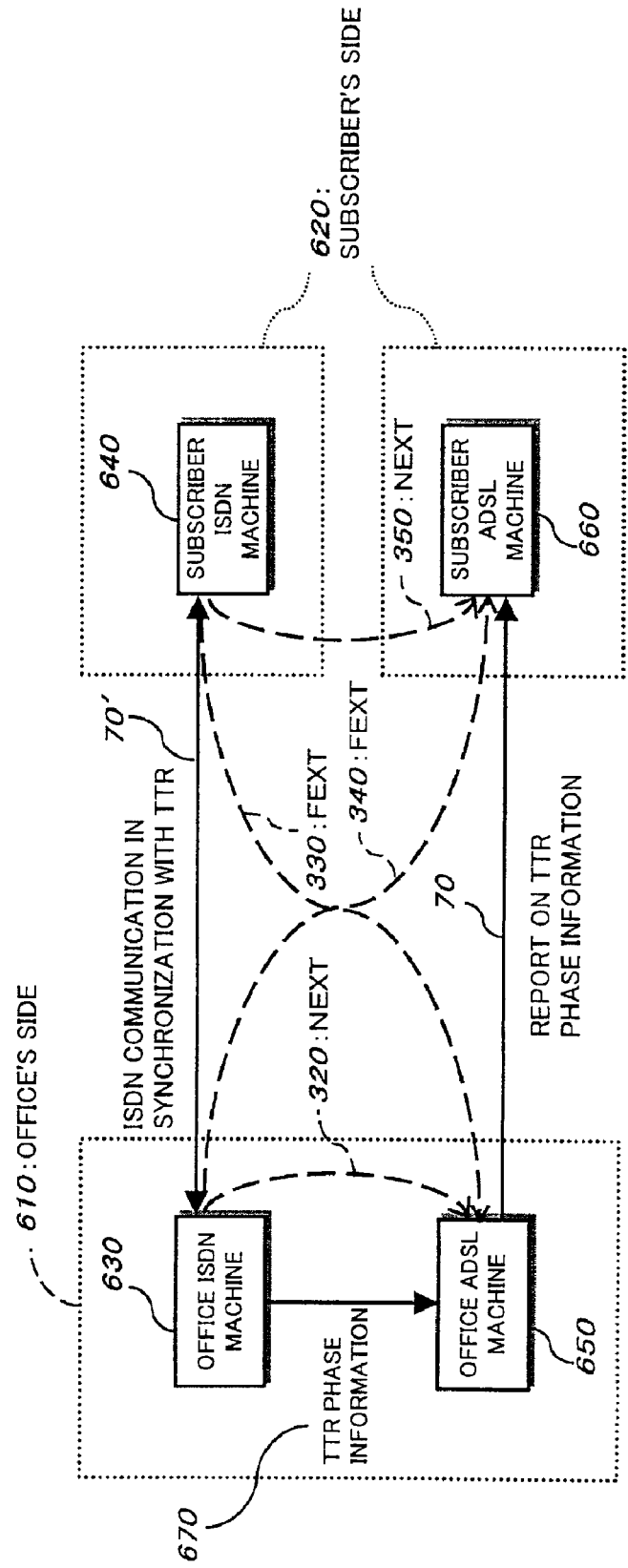
FIG. 11 is a block diagram showing an example of a system structure in the case where an ISDN ping-pong transmission line (TCM line) exists in the vicinity of an ADSL line.
Figure 15A:
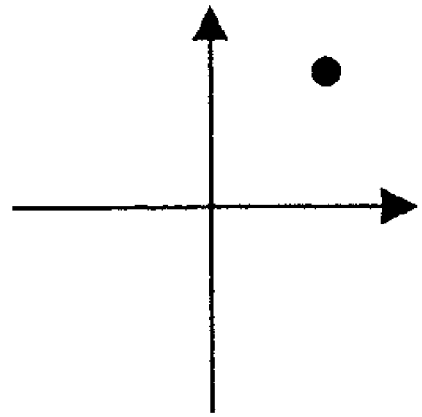
FIGS. 15(A) and 15(B) are diagrams for illustrating a method for reporting on TTR phase information by an FEXT symbol and an NEXT symbol.
Figure 15B:
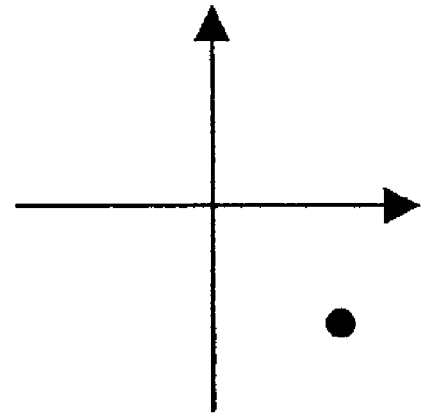

In FIG. 1, the data memory for TEQ 1540 connected to the TEQ 90 holds data for updating TEQ (TEQ coefficient) to be described later. The data memory for FEQ 1550 connected to the receiving side main block 1520 holds data for updating the FEQ coefficient (the coefficient Wi described above with reference to FIG. 10) of the above FEQ 120 in the receiving side main block 1520.

The above TTR off-synchronous detector 1560 detects off-synchronization with the above TTR 310. When a state where the subscriber ADSL machine 1 cannot accurately receive the pilot tone for maintaining synchronization transmitted from the office ADSL machine 650 due to an effect of impulse noise caused by off-hook or higher harmonic noise caused by ringer of a telephone connected to the same line 70 as the subscriber ADSL machine 1, or an effect of crosstalk noise caused by off-hook or ringer of a telephone in the adjacent line continues for a long time (1.8 ms or longer, for example) so that a magnitude of the received signal becomes larger than the permissible value in the FEXT section, or the S/N ratio of an arbitrary signal becomes smaller than the permissible value, or the TEQ coefficient, the FEQ coefficient and the AGC values change as rapidly as impermissible, the TTR off-synchronous detector 1560 recognizes that off-synchronization with the TTR 310 occurs.

When the above TTR off-synchronous detector 1560 detects off-synchronization with the TTR 310, the signal detection processor (correlation processor) 1570 performs a correlation process with receive data received in the off-synchronous state from the office transmitter 910 over the metallic line 70 and signal data normally received in the steady state from the office transmitter 910 and held therein, thereby detecting normally received past (known) signal data (synchronization symbol S or inverse synchronization symbol I) subjected to loss according to the transmission characteristics of the metallic line 70 from the above signal data received in the off-synchronous state.

For this purpose, the signal detection processor 1570 according to this embodiment comprises, when attention is paid to its essential parts, as shown in FIG. 1, a magnitude determination block 1120, a magnitude comparing memory 1130, a correlation block 1150, a correlation maximum value holding memory 1170, a control signal generator 1180, a frame boundary detection block 1410, and a frame boundary detecting memory 1430.

When synchronization with the TTR 310 (transmission cycle) in the above mentioned TCM transmission comes off, the above magnitude determination block 1120 determines a magnitude of output signal data of the TEQ 90 on the basis of data held in the magnitude comparing memory 1130, and controls validity/invalidity of a correlation operation in the correlation block 1150 in the following stage according to a result of the determination. When the synchronization with the TTR 310 is not off (at the time of steady communication) an output of the TEQ 90 is sent to the correlation block 1150 in the following stage through the magnitude determination block 1120.

The correlation block 1150 holds output signal data (synchronization symbol S or inverse synchronization symbol I) of the TEQ 90 via the above magnitude determination block 1120 obtained in the steady communication where synchronization with the TTR 310 is not off for use as data for resynchronizing with the TTR 310 when the synchronization with the TTR 310 comes off. When the synchronization with the TTR 310 comes off, the correlation block 1150 computes correlation between the above signal data held therein and a signal received over the metallic line 70 from the office transmitter 910 after the synchronization comes off.

The correlation bock 1150 performs a comparing process to determine whether or not a result of the correlation operation is larger than a maximum value of correlation values held in the correlation maximum value holding memory 1170. When a result of the correlation operation is larger than a maximum value of the correlation values held in the correlation maximum value holding memory 1170, the correlation block 1150 determines that a received signal used in the correlation operation at that time as a signal having the highest correlation with the known signal data received before the off-synchronization occurs, that is, a known synchronization symbol S or inverse synchronization symbol I, and detects it.

A position in the hyperframe 430 into which the synchronization symbol S or the inverse synchronization symbol I is inserted is beforehand decided. Therefore, the leading position of the hyperframe 430 is spontaneously detected from a count value so long as the above detection timing is counted by a counter or the like, so that resynchronization with the TTR 310 is possible.

Figure 2:
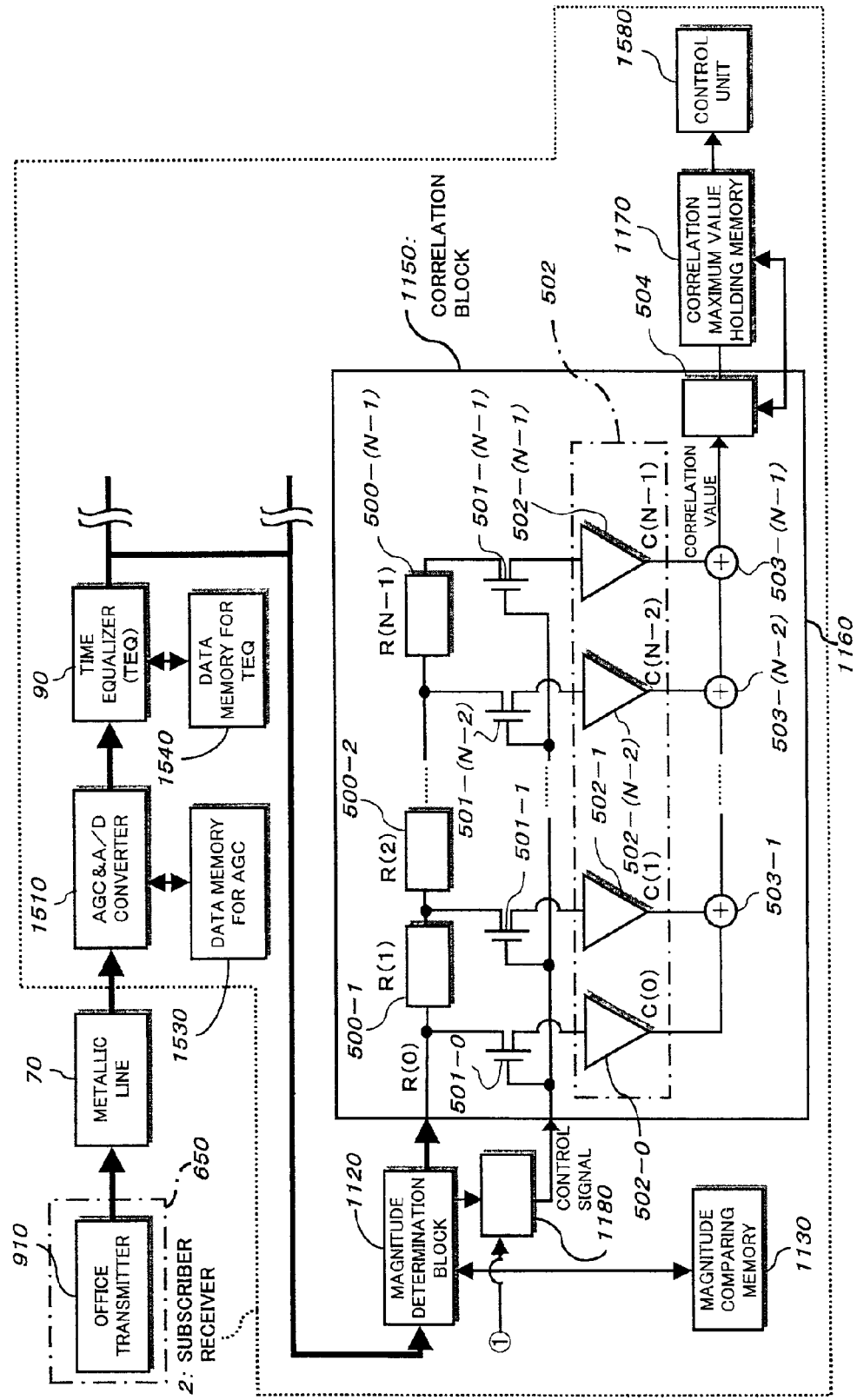
FIG. 2 is a block diagram showing a detailed structure of the subscriber receiver when attention is paid to a correlation block shown in FIG. 1.

In order to achieve such the function, the correlation block 1150 comprises, as shown in FIG. 2, for example, N−1 registers 500-1 to 500-(N−1), N FETs 501-0 to 501-(N−1), N multipliers 502-0 to 502-(N−1), N−1 adders 503-1 to 503(N−1), and a comparator 504. The above N represents the number of samples of one symbol of a DMT signal transmitted from the office transmitter 910, which is an integer not less than two.

The above registers 500-1 to 500-(N−1) hold respective samples of an input signal (DMT signal) in time series to obtain N sample data R(0) to R(N−1). The multipliers 502-0 to 502-(N−1) multiply the N sample data R(0) to R(i) (where i=1 to N−1) obtained by the registers 500-1 to 500-(N−1) by coefficients C(i) (where i=0 to N−1), respectively.

According to this embodiment, each of the multipliers 502-i holds one sample of known signal data (TEQ output of the synchronization symbol S or TEQ output of the inverse synchronization symbol I) transmitted from the office transmitter 910 over the metallic line 70 via the AGC & A/D converter 1510 and the TEQ 90 in the steady communication where no off-synchronization with the TTR 310 occurs as data for TTR resynchronization, whereby each of the coefficients C(i) is set.

Namely, each of the above multipliers 502-i functions as a memory (signal data holder; hereinafter referred to as a correlation reference data memory) 502 that holds known signal data received in the steady communication where no off-synchronization with the TTR 310 occurs as data for TTR resynchronization to be used when synchronization with the TTR 310 comes off.

When a communication time becomes longer in the steady communication, characteristics of the metallic line 70 changes due to a change in temperature during that, so that the TEQ output gradually changes. Therefore, after a certain period, a large difference between data held in the above correlation reference data memory 502 and characteristics (loss caused by the metallic line 70) of the current received signal generates. For this reason, it is desirable that the correlation reference data memory 502 is occasionally updated so as to hold the latest signal data (TEQ output) as much as possible.

In order to cope with a change in characteristics of the metallic line 70 due to a change in temperature, the TEQ coefficient may be updated. Since update of the TEQ coefficient causes a change in TEQ output, it is desirable to update the correlation reference data memory 502 even after the TEQ coefficient is updated. This is the same in the update of the AGC values in the AGC & A/D converter 1510.

According to this embodiment, the control unit 1580 changes the signal switch 1590 such that the TEQ output is outputted to the magnitude determination block 1120 in a constant cycle while the TEQ coefficient and the AGC values are not updated, or at the time of update of the TEQ coefficient and the AGC values in the steady communication where the TTR off-synchronous detector 1560 does not detect off-synchronization with the TTR 310, thereby updating the correlation reference data memory 502.

The adders 503-1 to 503-(N−1) add outputs of the multipliers 502-i. A result of the addition is outputted as a correlation value 1160 between the known signal data received in the steady communication and signal data received after off-synchronization with the TTR occurs. Namely, the correlation block 1150 functions as a correlation operator that performs a correlation operation expressed by the following formula (1) using the sample data R(0) to R(N−1) obtained after off-synchronization occurs and data held in the correlation reference data memory 502 [multipliers 502-0 to 502-(N−1)] in the steady communication, and outputs a result of the operation as the correlation value 1160.

$$\sum_{i=0}^{N-1} \{R(i)C(i)\} \quad (1)$$

Each of the above FETs 501-0 to 501-(N−1) is a gate switch for controlling to input/stop sample data R(0) to R(N−1) to a corresponding multiplier 502-0, 502-1, . . . or 502-(N−1) according to a control signal from the magnitude determination block 1120. Under the ON/OFF control by each of the FETs 501-0 to 501-(N−1), execution/halt of the above correlation operation, or the updating process of the above coefficient C(i) are controlled. Detailed description of this control will be described later.

The comparator (comparing unit) 504 compares the current correlation value 1160 obtained in the above correlation operation with the correlation value held in the correlation maximum value holding memory 1170 obtained in the past in the correlation operation. When the current correlation value 1160 is larger than the past correlation value 1160, the current correlation value 1160 is held in the correlation value holding memory 1170 so that the maximum value of the correlation values is updated.

When the maximum value of the correlation values 1160 is updated, information on a frame position [position of the ADSL frame for data 410 or the synchronization symbol S shown in FIG. 13(C)] in a received hyperframe 430 [refer to FIG. 13(B)] at that time, and information on a sample position [a position of a sample among N samples configuring the ADSL frame for data 410 or the synchronization symbol S shown in FIG. 13(C)] in that frame are also held in the correlation maximum value holding memory 1170 along with the above correlation value 1160. The information on a frame position in the hyperframe 430 and the information on a sample position in the frame at this time are determined as count values of a frame counter and a sample counter (not shown) that start counting with a start of the TTR resynchronization control by the control unit 1580 to be described later.

The count values (position information) at this time are temporary information. The position information finally held in the correlation maximum value holding memory 1170 after the above correlation operation is repeated on more than one hyperframe is used as information specifying the synchronization symbol S or the inverse synchronization symbol I, that is, information specifying the TTR 310. Namely, this process corresponds to protection of the above position information, which improves reliability of the information specifying the TTR 310.

The control unit (resynchronization controller) 1580 shown in FIG. 1 specifies the TTR 310 on the basis of the frame position information and the sample position information held in the above correlation maximum value holding memory 1170 to resynchronize with the TTR 310. If the synchronization symbol S in the second position from the head in the hyperframe 430 is detected in, for example, FIGS. 13(A) through 13(C), the inverse synchronization symbol I will be at the last sample position in the second superframe 420 from that symbol S. Based on this, a receive cycle of one hyperframe 430, that is, the TTR 310, is specified to resynchronize with it.

Practical establishment of resynchronization can be accomplished by controlling a holding time of the TEQ output in the serial to parallel buffer 100 such that a received signal is processed at a timing synchronous with the TTR 310 specified as above, and delaying the received signal by a predetermined quantity, for example. Namely, the control unit 1580 specifies the TTR 310 on the basis of a receiving timing of the signal data detected by the correlation operation in the correlation block 1150 in the signal detection processor 1570 as above, so as to establish resynchronization of communication with the office transmitter 910.

In the above signal detection processor 1570, the magnitude comparing memory (signal data maximum value holder) 1130 holds a maximum value of absolute values of signal data [coefficient c(i)] held in the correlation reference data memory 502 (multipliers 502-i) in the above correlation block 1150 or a value obtained by adding an arbitrary margin value to that maximum value.

The magnitude determination block 1120 determines received signal data whose absolute value received when off-synchronization with the TTR 310 is detected is below a value held in the above magnitude comparing memory 1130.

The control signal generator 1180 generates a control signal making each of the FETs 501-i (refer to FIG. 2) in the above correlation block 1150 ON for only signal data (section) determined to satisfy the above conditions in the magnitude determination block 1120 to execute the above correlation operation. For signal data not satisfying the above conditions, a control signal making the FET 501-i OFF, so that no correlation operation is executed.

Namely, the magnitude determination block 1120 and the control signal generator 1180 function as a maximum value determination type correlation operation controller that controls the correlation operation in the correlation block 1150 to be valid for only signal data received when off-synchronization occurs whose absolute value is not more than a maximum value of absolute values of signal data [coefficient C(i)] held in the correlation reference data memory 502 (multipliers 502-i) or a value obtained by adding an arbitrary margin value to that maximum value.

The reason to perform such the control is that signal data larger than a maximum value of absolute values of signal data [coefficient C(i)] held in the correlation data memory 502 (multipliers 502-i) or a value obtained by adding an arbitrary margin to that maximum value has a high probability that the signal data is not signal data that should be detected (synchronization symbol S or inverse synchronization symbol I), so that the signal data is excluded from objects of the correlation operation, thereby reducing a quantity of the operation in the correlation block 1150.

In order to discriminate signal data satisfying the above condition, the magnitude comparing memory 1130 is provided with a determination result holding memory 1131 for holding a result of the above determination as shown in FIG. 3. The control signal generator 1180 generates a control signal for making each of the FETs 501-i in the correlation block 1150 ON/OFF according to frame boundary information obtained in the frame boundary detection block 1410 as will be described later to control validity/invalidity of the correlation operation in the correlation block 1150.

When off-synchronization with the TTR 310 is detected in the TTR off-synchronization detector 1560, the frame boundary detection block 1410 in the signal detection processor 1570 detects a cyclic prefix portion of received data on the basis of correlation between signal data of the cyclic prefix on the head's side and signal data of the cyclic prefix on the tail's side of the receive data received thereafter to detect one DMT symbol length, and detects a frame boundary of the received signal (boundary of the ADSL frame for data 410 or the synchronization symbol S). The frame boundary detecting memory 1430 holds a result of the detection as frame boundary information.

When the number of samples of one DMT symbol transmitted from the office transmitter 910 is N and a length of the cyclic prefix is L, the frame boundary detection block 1410 comprises N+L−1 registers 401-1 to 401-(N+L−1), L multipliers 402-1 to 402-L, L−1 adders 403-1 to 403-(L−1), and a comparator 404.

Each of the registers 401-1 to 401-(N+1−L) holds one sample of one DMT symbol of the TEQ output (received signal data) so that the registers 401-1 to 401-(N+1−L) to provide sample data R(0) to R(N+L−1) in time series. The multipliers 402-1 to 402-L multiply sample data R(N) to R(N+L−1) of L samples on the head's side by sample data R(0) to R(L−1) of L samples on the tail's side among the sample data R(0) to R(N+L−1). The adders 402-1 to 403 (L−1) add results of the multiplication of the multipliers 402-1 to 402-L. A result of the addition is outputted as a correlation value 1420 of sample data of L samples on the above head's side and the tail's side.

The registers 401-1 to 401-(N+L−1), the multipliers 402-1 to 402-L, and the adders 403-1 to 403-(L−1) execute an operation expressed by the following formula (2), and output a result of the operation as the correlation value 1420.

$$\sum_{i=0}^{L-1} \{R(i)N(N+i)\} \quad (2)$$

The comparator 404 compares the correlation value 1420 obtained as above with a maximum value of the past correlation value 1420 held in the frame boundary detecting memory 1430. When the current correlation value 1420 is larger than the value held in the frame boundary detecting memory 1430, received signal data at this time has a high probability that the signal data is the cyclic prefix. Accordingly, the current correlation value 1420, and sample position information in the ADSL frame for data 410 or the synchronization symbol S are held in the frame boundary detecting memory 1430.

The sample position information is obtained from a count value of a counter (not shown) that starts to count with a start of the above frame boundary detection. The sample position information at this time is temporary position information. After the above process is repeated on more than several frames (after protection), sample position information held in the frame boundary detecting memory 1430 finally becomes information (frame boundary information) specifying a frame boundary.

The frame boundary information obtained as above is read by the control signal generator 1180. The control signal generator 1180 generates a control signal making each of the FETs 501-1 in the correlation block 1150 ON for only one DMT symbol length before a boundary of the ADSL frame for data 410 or the synchronization symbol S, for example, on the basis of the frame boundary information. In the correlation block 1150, the above correlation operation is always carried out (started) at a boundary position of a frame (DMT symbol).

The frame boundary detecting memory 1430 and the control signal generator 1180 function as a frame boundary detecting type correlation operation controller that makes the correlation block 1150 execute the above correlation operation on each frame specified by a frame boundary detected by the frame boundary detection block 1410. By performing such the control, a quantity of the correlation operation in the correlation block 1150 is further largely reduced.

The above frame detecting process or the correlation operation process after a frame boundary is detected are carried out by, for example, switching the signal switch 1590 by the control unit 1580. Namely, when the TTR off-synchronization detector 1560 detects off-synchronization, the control unit 1580 controls switching of the signal switch 1590 such that the TEQ output is inputted to the frame boundary detection block 1410. When a frame boundary is detected, the control unit 1580 controls the signal switch 1590 to switch such that the TEQ output is inputted to the magnitude determination block 1120 and the correlation block 1150.

(1) Description of Basic Operation

Next, description will be made of a basic operation (TTR resynchronizing method) of the TTR resynchronization controller 3 in the subscriber receiver 2 with the above structure. Incidentally, the operation of the office transmitter 910 and the basic operations of the AGC & A/D converter 1510, the TEQ 90, and the receiving side main block 1520 are similar to those described above with reference to FIGS. 6 through 15.

While the subscriber receiver 2 can normally receive signals in synchronization with the TTR 310 from the office transmitter 910, the control unit 1580 switches the signal switch 1590 such that the TEQ output is outputted to the correlation block 1150 at an appropriate timing (constant cycle; however, when the TEQ coefficient and the AGC value are updated, with this as an occasion), thereby making the correlation reference data memory 502 in the correlation block 1150 hold the TEQ output (for example, the TEQ output of the inverse synchronization symbol I), and carries out a work to update the held data to the latest data.

At this time, a maximum value of absolute values of signal data held in the correlation reference data memory 502 or a value obtained by adding an arbitrary margin value to that maximum value is held in the magnitude comparing memory 1130. The value held in the magnitude comparing memory 1130 is updated as soon as the value held in the above correlation reference data memory 502 is updated, so that the latest data is kept.

Under such conditions, when a state where the subscriber receiver 2 cannot accurately receive a pilot tone transmitted from the office transmitter 910 for a long time as stated before, off-synchronization with the TTR 310 occurs. The TTR off-synchronous detector 1560 detects the off-synchronization (off-synchronization detecting step).

When noise diminishes to a certain degree after that (when shift of amplitude or phase of the pilot tone, and magnitude or S/N ratio of a received signal fall within a permissible value even in burst), thus the TTR resynchronization controller 3 can recognize a received signal, the TTR resynchronization controller 3 starts the TTR resynchronous process using the above data held in the correlation reference data memory 502.

Figure 4:
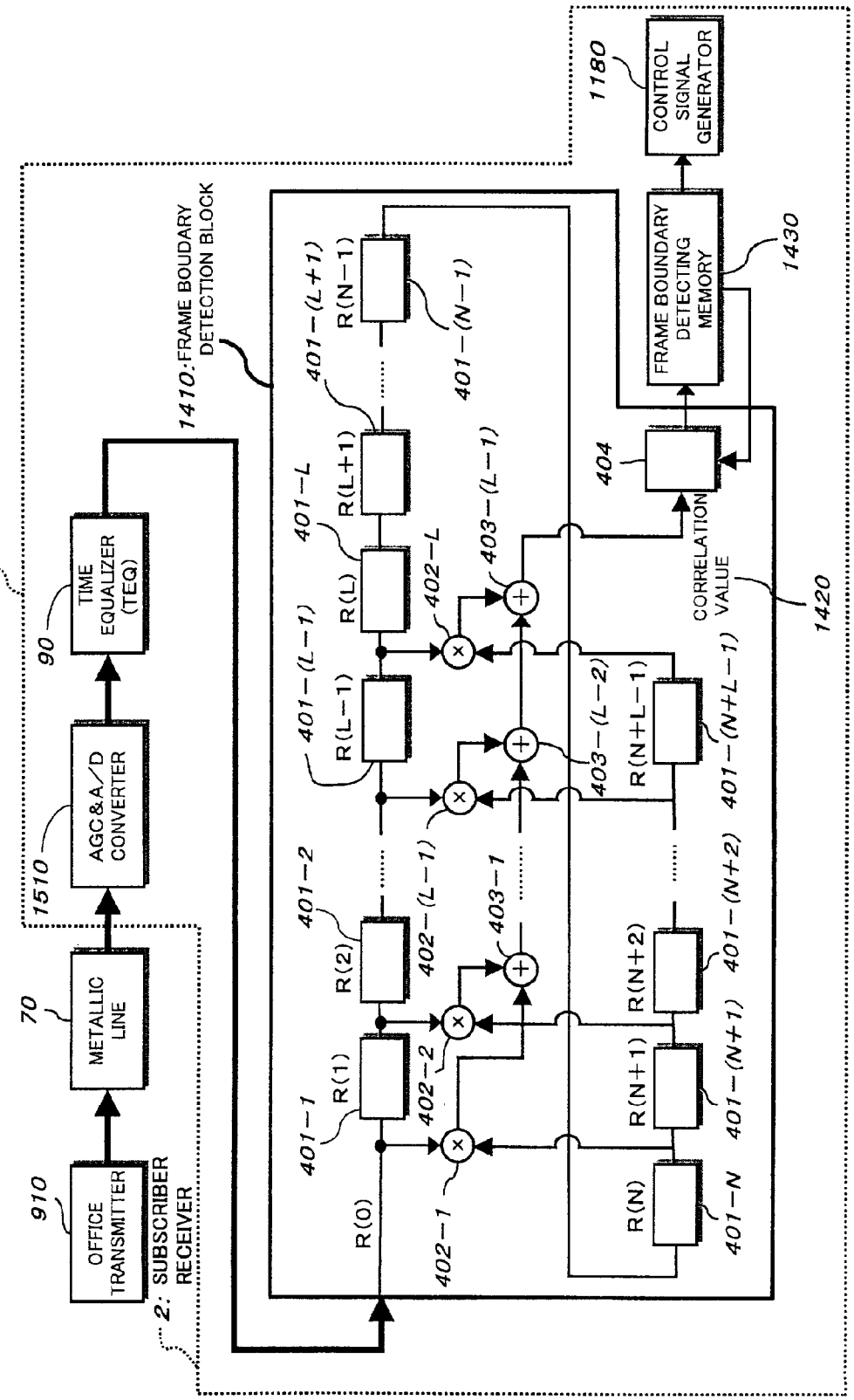
FIG. 4 is a block diagram showing a detailed structure of the subscriber receiver when attention is paid to a frame boundary detection block shown in FIG. 1.

First, the control unit 1580 switches the signal switch 1590 to the frame boundary detection block 1410 to feed a signal (TEQ output) received from the office transmitter 910 to the frame boundary detection block 1410. When one sample of the TEQ output is inputted to the frame boundary detection block 1410 via the signal switch 1590, the frame boundary detection block 1410 executes the operation represented by the above formula (2) (detection of the cyclic prefix) as described above with reference to FIG. 4. A result of the operation is obtained as the correlation value 1420.

The obtained correlation value 1420 is compared with a maximum value of the past correlation values 1420 held in the frame boundary detecting memory 1430 by the comparator 404. When the current correlation value 1420 is larger than the value held in the frame boundary detecting memory 1430, the current correlation value 1420 and sample position information in the ADSL frame for data 410 or the synchronization symbol S are held in the frame boundary detecting memory 1430. The sample position information in the frame 420 at this time is temporary position information, as stated before.

After that, signals held in the registers 401-1 to 401-(N+L−2) are shifted to the registers 401-2 to 401-(N+L−1) one tap by one tap. The latest received signal data [sample data R(0)] is then inputted to the registers 401-1, and the next operation is carried out. After this process is repeated for several frames or more (after protection), the sample position information held in the frame boundary detecting memory 1430 finally becomes information specifying a frame boundary (frame boundary detecting step).

When the frame boundary information is obtained as above, the control unit 1580 then switches the signal switches 1590 to the magnitude determination block 1120 to feed the TEQ output to the magnitude determination block 1120. Meanwhile, when the TTR off-synchronous detector 1560 detects TTR off-synchronization, the control unit 1580 may immediately switch the signal switch 1590 to the magnitude determination block 1120 without carrying out the frame boundary detecting step. The magnitude determination block 1120 compares a value held in the magnitude comparing memory 1130 with an absolute value of a received signal (one sample) inputted to the magnitude determination block 1120.

When an absolute value of the current received signal (TEQ output) inputted to the magnitude determination block 1120 is larger than a value held in the magnitude comparing memory 1130, "0" is obtained as a result of the determination. When not, "1" is obtained. This result of the determination is held at a memory number (address) J(0) in the determination result holding memory 1131 (refer to FIG. 3) in the magnitude comparing memory 1130. Incidentally, results of the determination are all "1" in the example shown in FIG. 3, but the result may be "0" in practice, as a matter of course.

Next, the TTR resynchronization controller 3 confirms contents held in the determination result holding memory 1131 by the control signal generator 1180, and confirms contents (frame boundary information) held in the frame boundary detecting memory 1430, as well. When results of the determination on the past one symbol held in the determination result holding memory 1131 are all "1", the control signal generator 1180 generates a control signal making each of the FETs 501-i in the correlation block 1150 ON at a frame timing specified by the frame boundary information in the frame boundary detecting memory 1430 to make the correlation operation by the correlation block 1150 valid.

When even one "0" exists in the determination results held in the determination result holding memory 1131 shown in FIG. 3, the TEQ output at this time has a high probability that the TEQ output is not known signal data (the inverse synchronization symbol I in this case) to be detected, so that a control signal making each of the FETs 501-i OFF, thus the correlation operation by the correlation block 1150 is not carried out.

When the next received signal (TEQ output) is inputted to the magnitude determination block 1120 after that, the determination results held at memory numbers J(0) to J(N−2) in the determination result holding memory 1131 are shifted to the memory numbers J(1) to J(N−1) one by one in order, and a result of determination on a received signal newly inputted is held in the determination result region at the memory number J(0). After that, determination on the magnitude of a signal is carried out, and validity/invalidity of the correlation operation by the correlation block 1150 is controlled in the similar manner.

The correlation block 1150 carries out the operation expressed by the above formula (1) each time the correlation operation is controlled to be valid by the above control signal, that is, carries out the operation on only a section that is assumed to be the TEQ output of the inverse synchronization symbol I according to a frame boundary detected by the frame boundary detection block 1410 and the magnitude determination (correlation operating step), and outputs a result of the operation as the correlation value 1160.

The obtained correlation value 1160 is compared with a maximum value of the past correlation values 1160 held in the correlation maximum value holding memory 1170 by the comparator 504. When the current correlation value 1160 is larger than the value held in the correlation maximum value holding memory 1170, the current correlation value 1160, and frame position information and sample position information at that time are held in the correlation maximum value holding memory 1170.

After that, signals held in the registers 500-1 to 500-(N−2) are shifted one tap by one tap to the registers 500-2 to 500-(N−1). Received data received next [sample data R(0)] is then inputted to the register 500-1, and the next operation is carried out. After the above correlation operating process is repeated for one hyperframe or more (after protection), the frame position information and the sample position information finally held in the correlation maximum value holding memory 1170 become information specifying the inverse synchronization symbol I (correlation processing step).

The control unit 1580 specifies a receiving timing for the inverse synchronization symbol I on the basis of the information held in the correlation maximum value holding memory 1170, and specifies the TTR 310 on the basis of it, thereby resynchronizing with the TTR 310 (resynchronization controlling step).

According to this embodiment, the TTR resynchronization controller 3 holds known signal data received in the steady communication (the TEQ output of the inverse synchronization symbol I) as signal data for resynchronization. When off-synchronization with the TTR 310 occurs, the TTR resynchronization controller 3 detects received data having the highest correlation with the known signal data on the basis of correlation between received data received asynchronously with the TTR 310 after that with the held signal data for resynchronization, and specifies the TTR 310 from a receiving timing of that signal data to resynchronize with the TTR 310. It is therefore unnecessary to once more perform the initialing process in order to resynchronize with the TTR 310; it is possible to restore the communication with the office ADSL machine 650 to resume it.

According to this embodiment, the TEQ output of a practical received signal subjected to an effect (transmission loss) due to transmission characteristics of the metallic line 70 is held as the above signal data for resynchronization. When off-synchronization occurs, signal data having the highest correlation with the above signal data for resynchronization is detected from received data received in the equivalent conditions to the signal data for resynchronization over the metallic line 70 (frame boundary detection, magnitude determination and correlation operation), then the resynchronization control is performed. It is therefore possible to certainly establish resynchronization in consideration of even the transmission characteristics of the metallic line 70.

According to this embodiment, the above correlation operation by the correlation block 1150 is performed on only a section assumed to be the TEQ output of the inverse synchronization symbol I according to a frame boundary detected by the frame boundary detection block 1410 and the above magnitude determination; signal data other than signal data to be detected does not become an object of the correlation operation. This largely reduces wasteful correlation operation processes, and reduces the quantity of the process until resynchronization is established.

Until resynchronization with the TTR 310 is established, the control unit 1580 does not update the TEQ coefficient, FEQ coefficient and AGC values, according to this embodiment. Next, this process will be described.

(2) Description of Restoring Process for TEQ Coefficient, FEQ Coefficient, and AGC Values As stated above, the TEQ coefficient, the FEQ coefficient and the AGC values have important meanings, which are updated even in the steady communication in order to keep the best values. However, when the subscriber receiver 2 gets out of synchronization with the TTR 310 during the steady communication, the update is carried out using a received signal affected by the noise. Even when resynchronization is established after the noise ceases, the above TEQ coefficient, the FEQ coefficient and the AGC values cannot be continuously used in communication thereafter.

According to this embodiment, in the steady communication state where the subscriber receiver 2 is not out of synchronization with the TTR 310 and normally transmits/receives data to/from the office transmitter 910, the TEQ coefficient (coefficient of the TEQ 90 described above with reference to FIG. 9) is held in the data memory for data 1540, the FEQ coefficient (Wi described above with reference to FIG. 10) is held in the data memory for FEQ 1550, and the analog AGC value and the digital AGC value are held in the data memory for AGC 1530 for use as data for steady communication after resynchronization with the TTR is established, and they are updated as needed in order that they are always the latest data. These works are controlled by, for example, the control unit 1580.

When resynchronization is established after the subscriber receiver 2 gets out of synchronization with the TTR 310 as above, the control unit 1580 makes the AGC & A/D converter 1510 (AGC 160; refer to FIG. 6), the TEQ 90, and the FEQ 120 (refer to FIG. 6) read data (AGC values, TEQ coefficient, and FEQ coefficient) held in the memories 1530 to 1550 to use the data for the steady communication.

The subscriber receiver 2 can thereby avoid the data to be updated on the basis of a received signal without reliability obtained while the synchronization is off, so that communication after resynchronization with the TTR 310 is established can be stabilized as same as before the occurrence of the off-synchronization.

Meanwhile, a timing to read data held in the memories 1530 to 1550 by the AGC & A/D converter 1510 (AGC 160), the TEQ 90, and the FEQ 120 may be when resynchronization is established as described above, or when the resynchronizing process is initiated. In the latter case, a control is required in order to avoid the data read by the AGC & A/D converter 1510 (AGC 160), the TEQ 90, and the FEQ 120 to be updated until resynchronization is established.

In the steady communication, the AGC 160 measures magnitudes of an analog signal in the multiplier 170 and a digital signal in the multiplier 180 to update AGC values of the respective signals as needed, as stated above. When an analog AGC value is updated, the analog signal might come to have a magnitude that the AGC 160 does not expect due to delay caused by analog elements until practical setting and updating are completed after the AGC 160 instructs the setting and updating of the analog AGC value, which leads to an error.

In order to avoid an effect of delay caused by such analog elements, the control unit 1580 may set and update the analog AGC value in a section of the synchronization symbol S or the inverse synchronization symbol I received once during one super frame 420, or a section in which only the pilot tone is received in the case of the FEXT bit map system, that is, a section in which the subscriber receiver 2 does not receive user data. Whereby, it is possible to do the setting and updating of the analog AGC value at a desirable timing.

In the initialization, the control unit 1580 may control to perform the setting and updating of the analog AGC value in the NEXT section in which a NEXT symbol is received in the case of the dual bitmap system, or in a section in which only pilot tone is received in the case of the FEXT bit map system. The reason of this is that the subscriber receiver 2 performs the initialization using mainly the FEXT symbol. The above is the updating of the analog AGC value. The similar control is possible even in the receiver in the office ADSL machine 650. The setting and updating of the analog AGC value may be done in a section in which user data that is comparatively allowed to have some errors is received.

(3) Description of the Subscriber Transmitter

The subscriber ADSL machine 1 is provided with a subscriber transmitter having an equivalent function to the office transmitter 910, as stated above. When a signal is transmitted from the subscriber transmitter to the office ADSL machine 650 (office receiver) during the above resynchronizing process, noise might be added to the received signal from the office transmitter 910 due to crosstalk or the like of the transmit signal, which in turn might affect to the above resynchronizing process.

For this, the control unit 1580 may stop transmitting a signal from the subscriber transmitter to the office ADSL machine 650 from when off-synchronization with the TTR 310 occurs to when resynchronization with the TTR 310 is established, as stated above. It is thereby possible for the subscriber receiver 2 to prevent a transmit signal to the office ADSL machine 650 from being noise to a received signal from the office transmitter 910. Accordingly, the TTR resynchronous controller 3 can readily and accurately detect a frame boundary, determine a magnitude of a signal, and detect a known signal (inverse synchronization symbol I) in the correlation operation process so as to more stabilize the resynchronization control.

(B) Description of a Modification

In the above-described embodiment, a maximum value of absolute values of data held in the correlation reference data memory 502 in the correlation block 1150 or a value obtained by adding an arbitrary margin to that maximum value is used as a reference value for determining a magnitude of received data in the magnitude determination block 1120. However, it is alternatively possible to use a minimum value of absolute values of data held in the correlation reference data memory 502 or a value obtained by adding an arbitrary margin value to that minimum value, for example, to perform the similar determination. Next, this determining manner will be described.

Figure 5:
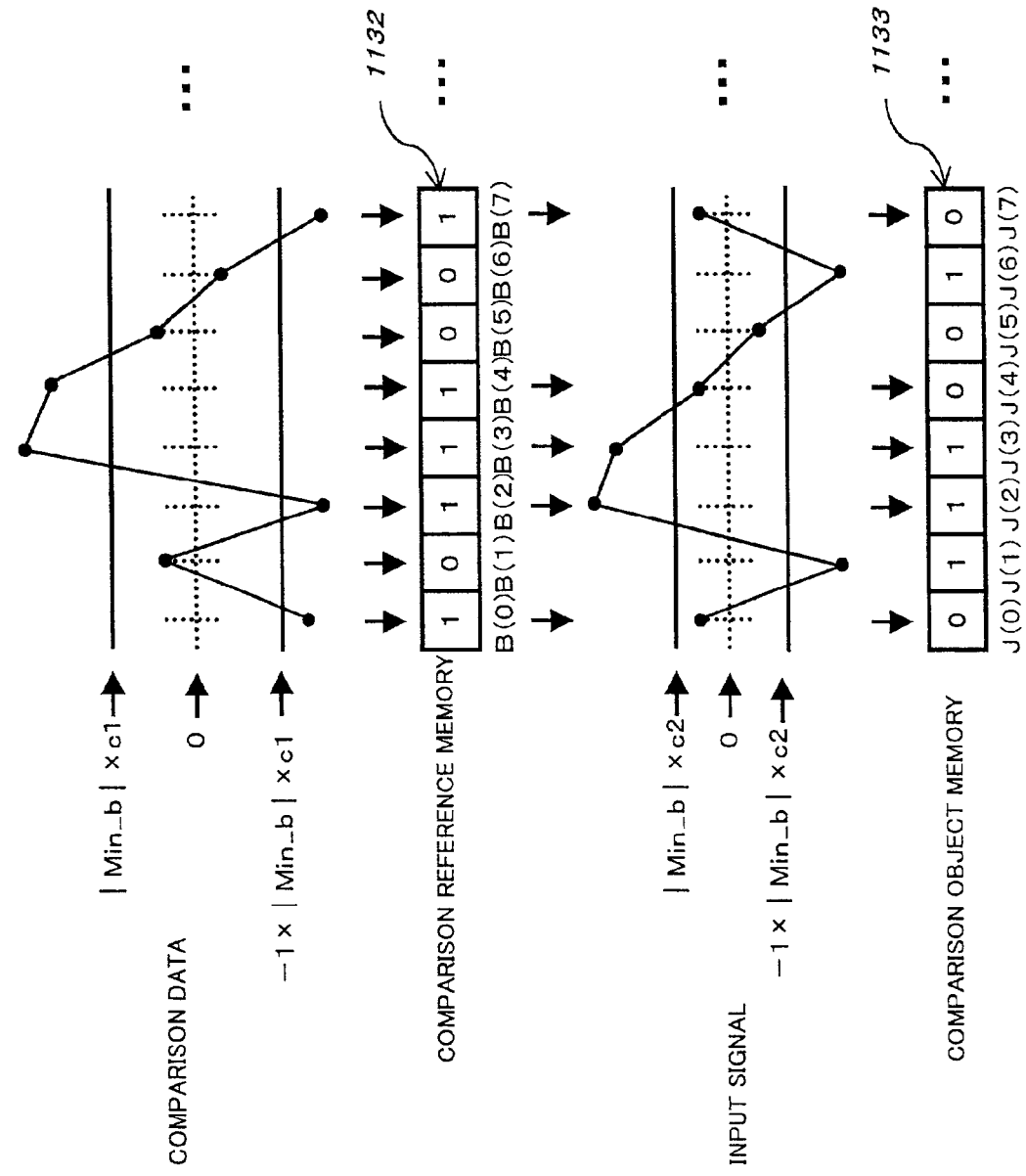
FIG. 5 is a diagram for illustrating a modification of a process in a magnitude determination block shown in FIG. 1.

In the steady communication, known signal data (TEQ output of the inverse synchronization symbol I) is held as data for TTR resynchronization in the correlation reference data memory 502 in the correlation block 1150 as stated above. In this case, a minimum value of absolute values of the data or a value obtained by adding an arbitrary value to that minimum value is considered to be |Min_b|, as shown in FIG. 5, for example. A value |Min_b|×c1 obtained by multiplying |Min_b| by an arbitrary coefficient c1 is compared as a reference with an absolute value of the above known signal data (held data). When the absolute value of the known signal data is larger than |Min_b|×c1, "1" is held in a comparison reference memory 1132 in the magnitude comparing memory 1130. When the absolute value of the known signal data is not larger than |Min_b|×c1, "0" is held.

The example shown in FIG. 5 shows memory addresses of only B(0) to B(7) in the comparison reference memory 1132, but the memory addresses practically extends to B(N−1) when using the above N. In this case, when contents of the correlation reference data memory 502 are updated for the above reason, contents of the comparison reference memory 1132 are also updated each time of it.

When the subscriber receiver 2 gets out of synchronization with the TTR 310 in the above state, the subscriber receiver 2 resynchronizes with the TTR 310 using data held in the correlation reference data memory 502 by means of the TTR resynchronization controller, as stated above. A signal transmitted from the office transmitter 910 and received by the subscriber receiver 2 is first inputted to the magnitude determination block 1120 before inputted to the correlation block 1150.

In the determination block 1120, a value |Min_b|×c2 obtained by multiplying the above |Min_b| by an arbitrary coefficient c2 not larger than c1 is compared with an absolute value of a signal inputted to the magnitude determination block 1120. When the absolute value of the signal inputted to the magnitude determination block 1120 is larger than |Min_b|×c2, for example, "1" is inputted as a result of the determination at a memory address J(i) (i=0 to N−1) in a comparison object memory 1133, as shown in the example in FIG. 5. When not, "0" is held. The example in FIG. 5 shows only memory addresses J(0) to J(7) of the comparison object memory 1133, but the memory addresses practically extend to J(N−1) when using the above N similarly to the above comparison reference memory 1132.

Then J(i) at the time of the above comparison reference memory B(i)=1 are confirmed. When all J(i) of the past one symbol are 1 [J(i)=1], signal data at that time has a high probability that the signal data is data (TEQ output of the inverse synchronization symbol I) that should be detected. Therefore, the control signal generator 1180 generates a control signal making each of the FETs 501-i in the correlation block 1150 ON when it is a timing specified by the frame boundary information detected by the frame boundary detection block 1410, so that the correlation operation is carried out in the correlation block 1150 in the similar manner to the above.

When J(i) are not all "1," the control signal generator 1180 generates a control signal making each of the FETs 501-i OFF, so that the correlation operation is not carried out in the correlation block 1150. In the example shown in FIG. 5, for instance, i at which B(i)=1 are "0", "2", "3", "4", and "7", so that J(i) are not all "1" [there are J(i) that are "0" among J(0), J(2), J(3), J(4), and J(7)]. Consequently, all the FETs 501-i are controlled to be OFF by the control signal from the control signal generator 1180, so that the correlation operation is not carried out.

When the subscriber receiver 2 receives the next signal data thereafter, results held at the memory addresses J(0) to J(N−2) in the comparison object memory 1133 are shifted one by one to the memory addresses J(1) to J(N−1) in the magnitude determination block 1120, and a result of comparison with respect to the above signal inputted to the magnitude determination block 1120 is newly held at the memory address J(0). After that, determination on a magnitude of the signal is done in the similar manner, and validity/invalidity of the correlation operation is controlled by the correlation block 1150.

According to this modification, the magnitude comparing memory 1130 functions as a signal data minimum value holder for holding a result of magnitude comparison between a minimum value of absolute values of signal data held in the comparison reference data memory 502, or a value obtained by multiplying a value |Min_b| that is obtained by adding an arbitrary margin value to that minimum value with an arbitrary coefficient c1, and an absolute value of signal data held in the comparison reference memory 1132. The magnitude determination block 1120 and the control signal generator 1180 function as a minimum value determination type correlation operation controller for executing the correlation operation in the correlation block 1150 in only a time section in which absolute values of the above received data of whole one symbol are all larger than a value obtained by multiplying |Min_b| by an arbitrary coefficient c2 not larger than a coefficient c1 at samples whose values in the comparison reference memory 1132 are "1".

According to this modification, the above correlation operation in the correlation block 1150 is performed on only a time section that is assumed to be a frame boundary detected by the frame boundary detection block 1410 and the TEQ output of the inverse synchronization symbol I by the above volume determination, so that signal data other than signal data that should be detected does not become an object of the correlation operation. As a result, wasteful correlation operation process is largely diminished, and a quantity of the process to be performed until resynchronization is established is largely decreased.

(C) Others

In the description of the operations in the above embodiment and modification, the TEQ output of the inverse synchronization symbol I is held as known signal data for resynchronization in the correlation reference data memory 502. It is alternatively possible to hold the synchronization symbol S to resynchronize with the TTR 310 in the similar manner.

The correlation reference data memory 502 may hold an average value of the TEQ output of the inverse synchronization symbol I or the synchronization symbol S. In which case, effects of the metallic line 70 on a received signal (known signal held) can be averaged with respect to time, which leads to more stable resynchronization control and improvement of reliability of the resynchronization control.

The above signal detecting process may be performed in the following manner. Namely, the TEQ output of the synchronization symbol S and the TEQ output of the inverse synchronization symbol I are held as signal data for resynchronization in the steady communication. When off-synchronization occurs, a process of detecting the synchronization symbol S from the TEQ output (received signal data) is first performed. When a signal assumed to be the synchronization symbol S is detected, a process of detecting the inverse synchronization symbol I is next performed. When a signal assumed to be the inverse synchronization symbol I is detected, a process of detecting the synchronization symbol S is further performed.

When a signal assumed to be the synchronization symbol S is detected as a result, it can be recognized that a signal having been detected as the inverse synchronization symbol I is practically the inverse synchronization symbol I since a position at which the inverse synchronization symbol I should be inserted is beforehand decided, whereby the TTR 310 can be specified.

According to the above manner, a repetitive process for protection described above can be minimized, leading to a decrease in process quantity and delay time required until resynchronization is established.

In the above examples, the magnitude determining function (the magnitude determination block 1120 and the magnitude comparing memory 1130) and the frame boundary detecting function (the frame boundary detection block 1410 and the frame boundary detecting memory 1430) are provided in order to decrease a quantity of the correlation operation in the correlation block 1150. However, even either one of them can decrease a quantity of the correlation operation. Alternatively, the correlation block 1150 may perform the correlation operation on all received signals without these functions to detect a known signal, thereby resynchronizing with the TTR 310.

Note that the present invention is not limited to the above embodiment and modification, but may be modified in various ways without departing from the scope of the invention.

What is claimed is:

1. A resynchronization control apparatus for a subscriber communication machine which communicates with an office communication machine over an existing communication line comprising:

an off-synchronous detector for detecting off-synchronization of communication with said office communication machine;

a correlation processor for, when said off-synchronization is detected, correlatively processing received data received over said existing communication line and held data having been transmitted from said office communication machine in a steady state; and a resynchronization controller for specifying a synchronous timing based on said correlative processing of said correlation processor to establish resynchronization in communication with said office communication machine;

wherein said correlation processor comprises:

a signal holder for holding said held data received from said office communication machine in steady communication;

a correlation operator for operating correlation between said held data held in said signal holder and received data received after detection of said off-synchronization to detect received data having high correlation with said held data received in a steady state;

a signal data maximum value holder for holding a maximum value of absolute values of said held data or a value obtained by adding an arbitrary margin value to said maximum value; and a maximum value determination correlation operation controller for making said correlation operator carry out said correlation operation in only a time section in which absolute values of received data received after said off-synchronization is detected are not larger than a value held in said signal data maximum value holder.

2. A resynchronization control apparatus for a subscriber communication machine which communicates with an office communication machine over an existing communication line comprising:

an off-synchronous detector for detecting off-synchronization of communication with said office communication machine;

a correlation processor for, when said off-synchronization is detected, correlatively processing received data received over said existing communication line and held data having been transmitted from said office communication machine in a steady state; and a resynchronization controller for specifying a synchronous timing based on said correlative processing of said correlation processor to establish resynchronization in communication with said office communication machine;

wherein said correlation processor comprises:

a signal holder for holding signal data received from said office communication machine in steady communication;

a correlation operator for operating correlation between held data held in said signal holder and received data received after detection of said off-synchronization to detect received data having high correlation with said held data;

a signal data minimum value holder for holding a minimum value, as a first value, of absolute values of said held data or a second value obtained by multiplying a value, which is obtained by adding an arbitrary margin value to said minimum value, by an arbitrary coefficient, and a result of comparison between one of the first and second value and an absolute value of said held data; and a minimum value determination correlation operation controller for making said correlation operator carry out said correlation operation in only a time section in which absolute values of received data of whole one symbol received after said off-synchronization is detected are larger than said minimum value or a value obtained by multiplying a value, which is obtained by adding an arbitrary margin value to said minimum value, by another arbitrary coefficient not larger than said arbitrary coefficient at samples in which absolute values of said held data are determined to be larger as results of said comparison.

3. A resynchronization control apparatus for a subscriber communication machine which communicates with an office communication machine over an existing communication line comprising:

an off-synchronous detector for detecting off-synchronization of communication with said office communication machine;

a correlation processor for, when said off-synchronization is detected, correlatively processing received data received over said existing communication line and held data having been transmitted from said office communication machine in a steady state; and a resynchronization controller for specifying a synchronous timing based on said correlative processing of said correlation processor to establish resynchronization in communication with said office communication machine;

wherein said correlation processor comprises:

a signal holder for holding signal data received from said office communication machine in steady communication;

a correlation operator for operating correlation between held data held in said signal bolder and received data received after detection of said off-synchronization to detect received data having high correlation with said held data;

a frame boundary detector for detecting a frame boundary of said signal data based on correlation between signal data of a length of a cyclic prefix attached to a head of received data received after off-synchronization is detected and signal data of a length of the cyclic prefix attached to a tail of the received data; and a frame boundary detection correlation operation controller for making said correlation operator carry out said correlation operation on a frame specified by a frame boundary detected by said frame boundary detector.

4. A resynchronization control apparatus for a subscriber communication machine which communicates with an office communication machine over an existing communication line comprising:

an off-synchronous detector for detecting off-synchronization of communication with said office communication machine;

a correlation processor for, when said off-synchronization is detected, correlatively processing received data received over said existing communication line and held data having been transmitted from said office communication machine in a steady state; and a resynchronization controller for specifying a synchronous timing based on said correlative processing of said correlation processor to establish resynchronization in communication with said office communication machine;

wherein said correlation processor comprises:

a signal holder for holding signal data received from said office communication machine in steady communication;

a correlation operator for operating correlation between held data held in said signal holder and received data received after detection of said off-synchronization to detect received data having high correlation with said held data;

a signal data maximum value holder for holding a maximum value of absolute values of said held data or a value obtained by adding an arbitrary margin value to said maximum value; and a maximum value determination correlation operation controller for making said correlation operator carry out said correlation operation in only a time section in which absolute values of received data received after said off-synchronization is detected are not larger than a value held in said signal data maximum value holder, wherein said signal holder holds an average value of received data in a particular time section in said steady communication as said held data.

5. A resynchronization control apparatus for a subscriber communication machine which communicates with an office communication machine over an existing communication line comprising:

an off-synchronous detector for detecting off-synchronization of communication with said office communication machine;

a correlation processor for, when said off-synchronization is detected, correlatively processing received data received over said existing communication line and held data having been transmitted from said office communication machine in a steady state; and a resynchronization controller for specifying a synchronous timing based on said correlative processing of said correlation processor to establish resynchronization in communication with said office communication machine;

wherein said correlation processor comprises:

a signal holder for holding signal data received from said office communication machine in steady communication;

a correlation operator for operating correlation between held data held in said signal holder and received data received after detection of said off-synchronization to detect received data having high correlation with said held data;

a signal data minimum value holder for holding a minimum value, as a first value, of absolute values of said held data or a second value obtained by multiplying a value, which is obtained by adding an arbitrary margin value to said minimum value, by an arbitrary coefficient, and a result of comparison between the first or second value and an absolute value of said held data; and a minimum value determination correlation operation controller for making said correlation operator carry out said correlation operation in only a time section in which absolute values of received data of whole one symbol received after said off-synchronization is detected are larger than said minimum value or a value obtained by multiplying a value, which is obtained by adding an arbitrary margin value to said minimum value, by another arbitrary coefficient not larger than said arbitrary coefficient at samples in which the absolute values of said held data are determined to be larger as results of said comparison, wherein said signal holder holds an average value of received data in a particular time section in said steady communication as said held data.

6. A resynchronization control apparatus for a subscriber communication machine which communicates with an office communication machine over an existing communication line comprising:

an off-synchronous detector for detecting off-synchronization of communication with said office communication machine;

a correlation processor for, when said off-synchronization is detected, correlatively processing received data received over said existing communication line and held data having been transmitted from said office communication machine in a steady state; and a resynchronization controller for specifying a synchronous timing based on said correlative processing of said correlation processor to establish resynchronization in communication with said office communication machine;

wherein said correlation processor comprises:

a signal holder for holding signal data received from said office communication machine in steady communication;

a correlation operator for operating correlation between held data held in said signal holder and received data received after detection of said off-synchronization to detect received data having high correlation with said held data;

a frame boundary detector for detecting a frame boundary of said signal data based on correlation between signal data of a length of a cyclic prefix attached to a head of received data received after off-synchronization is detected and signal data of a length of the cyclic prefix attached to a tail of the received data; and a frame boundary detection correlation operation controller for making said correlation operator carry out said correlation operation on a frame specified by a frame boundary detected by said frame boundary detector, wherein said signal holder holds an average value of received data in a particular time section in said steady communication as said held data.

7. A resynchronizing method for a subscriber machine which communicates with an office communication machine over an existing communication line comprising the steps of:

an off-synchronization detecting step of detecting off-synchronization with said office communication machine;

a correlation processing step of correlatively processing, when said off-synchronization is detected, received data received over said existing communication line and held data having been transmitted from said office communication machine in a steady state; and a resynchronization controlling step of specifying a synchronous timing based on said correlative processing at said correlation processing step to establish resynchronization of the communication with said office communication machine, wherein said correlation processing step comprising the steps of:

a signal holding step of holding signal data received from said office communication machine in steady communication; and a correlation operating step of operating correlation between said held data and received data received after said off-synchronization is detected to detect received data having high correlation with said held data, and wherein at said correlation operating step, said correlation operation is carried out in only a time section in which absolute values of received data received from said office communication machine are not larger than a maximum value of absolute values of said held data or a value obtained by adding an arbitrary margin value to said maximum value.

8. A resynchronizing method for a subscriber communication machine which communicates with an office communication machine over an existing communication line comprising the steps of:

an off-synchronization detecting step of detecting off-synchronization with said office communication machine;

a correlation processing step of correlatively processing, when said off-synchronization is detected, received data received over said existing communication line and held data having been transmitted from said office communication machine in a steady state; and a resynchronization controlling step of specifying a synchronous timing based on said correlative processing at said correlation processing step to establish resynchronization of the communication with said office communication machine, wherein said correlation processing step comprising the steps of:

a signal holding step of holding signal data received from said office communication machine in steady communication; and a correlation operating step of operating correlation between said held data and received data received after said off-synchronization is detected to detect received data having high correlation with said held data, and wherein at said correlation operating step, a minimum value of absolute values of said held data or a value obtained by multiplying a value, which is obtained by adding an arbitrary margin value to said minimum value, by an arbitrary coefficient is compared with a magnitude of an absolute value of said held data, and said correlation operation is carried out in only a time section in which absolute values of received data of whole one symbol received after said off-synchronization is detected are larger than said minimum value or a value obtained by multiplying a value, which is obtained by adding an arbitrary margin value to said minimum value, by another arbitrary coefficient not larger than said arbitrary coefficient at samples in which the absolute values of said held data are determined to be larger as results of said comparison.

9. A resynchronizing method for a subscriber communication machine which communicates with an office communication machine over an existing communication line comprising the steps of:

an off-synchronization detecting step of detecting off-synchronization with said office communication machine;

a correlation processing step of correlatively processing, when said off-synchronization is detected, received data received over said existing communication line and held data having been transmitted from said office communication machine in a steady state; and a resynchronization controlling step of specifying a synchronous timing based on said correlative processing at said correlation processing step to establish resynchronization of the communication with said office communication machine, wherein said correlation processing step comprises the steps of:

a signal holding step of holding signal data received from said office communication machine in steady communication; and a correlation operating step of operating correlation between said held data and received data received after said off-synchronization is detected to detect received data having high correlation with said held data, and wherein said correlation processing step comprises a frame boundary detecting step of detecting a frame boundary of received data received from said office communication machine based on correlation between signal data of a length of a cyclic prefix at a head of received data received from said office communication machine after said off-synchronization is detected and a signal data of a length of the cyclic prefix at a tail of the received data; and at said correlation operating step, said correlation operation is carried out on a frame specified by the frame boundary detected at said frame boundary detecting step.

* * * * *